United States Patent
Terry

(10) Patent No.: US 10,103,918 B2
(45) Date of Patent: *Oct. 16, 2018

(54) METHOD AND APPARATUS FOR RANGE AND COVERAGE EXTENSION IN A HETEROGENEOUS DIGITAL CHAOS COOPERATIVE NETWORK

(71) Applicant: John David Terry, Annandale, VA (US)

(72) Inventor: John David Terry, Annandale, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/422,468

(22) Filed: Feb. 2, 2017

(65) Prior Publication Data
US 2018/0219712 A1    Aug. 2, 2018

(51) Int. Cl.
*H04L 27/26* (2006.01)
*H04L 5/00* (2006.01)
*H04W 4/06* (2009.01)

(52) U.S. Cl.
CPC ........ *H04L 27/2623* (2013.01); *H04L 5/0044* (2013.01); *H04L 27/2627* (2013.01); *H04W 4/06* (2013.01)

(58) Field of Classification Search
CPC .............. H04L 27/2623; H04L 5/0044; H04L 27/2627; H04W 4/06
USPC ........................................................ 375/260
See application file for complete search history.

(56) References Cited

U.S. PATENT DOCUMENTS

2017/0163296 A1*   6/2017   Terry ................... H04B 1/0475

* cited by examiner

*Primary Examiner* — Michael Neff
(74) *Attorney, Agent, or Firm* — Patrick Mixon

(57) ABSTRACT

The present invention teaches a system and method for signal recovery for range and coverage extension in a heterogeneous cooperative network of digital chaos transmissions with OFDM component signal transmission. The invention improves upon the state of art in side channel information from the transmit side containing information on the clipped amplitude. In-band transmission of the side information is achieved by exploiting the sparsity of the resulting clip amplitude position in conjunction with hash function to map keys to values, where the values at the position location for the clipped amplitude. The information rate of the clipped amplitude is sub-Nyquist relative to the original OFDM component signal transmission, which allows very low power spreading by a cooperative digital chaos sequences at a transmit side and recovery of the clipped amplitude at a receive side. Further, an improved noise resistance side channel performance is achieved by mapping to clipping amplitudes to scaled digital chaos samples preloaded on the receive device. A network manager or coordinator can update these scaled digital chaos samples during scheduled beacon frames to improvement network performance.

9 Claims, 15 Drawing Sheets

Fig. 14: Key Distribution Module

METHOD AND APPARATUS FOR RANGE AND COVERAGE EXTENSION IN A HETEROGENEOUS DIGITAL CHAOS COOPERATIVE NETWORK

FEDERAL FUNDING LEGEND

This invention was produced in part using funds obtained through a grant from the Army Small Business Innovation Research. Consequently, the federal government has certain rights in this invention.

RELATED APPLICATIONS

The present application is a continuation in part of U.S. application Ser. No. 15/520,318, titled "Method and Apparatus for Secure Network Access and Group Membership in a Digital Chaos Cooperative Network," filed on Sep. 20, 2016, which is a continuation-in-part of U.S. Pat. No. 9,479,217, titled "Method and Apparatus for Communicating Data in a Digital Chaos Cooperative Network," issued Oct. 25, 2016, which is commonly invented by the applicant of this invention.

Field of Invention

This invention relates generally to wireless communication systems and embedded wireless systems. In particular, this invention relates dynamic channel access in a cooperative network of embedded digital signals and digital information within digital chaos waveforms. The invention also relates to cooperative channel sensing of heterogeneous wireless communications systems comprised of at least one embedded wireless system with multiple signal aggregation at the transmitter and multiple detection at the receiver, wherein digital signals and digital information is embedded within multiple digital chaos waveforms. Further, the invention relates to improving link performance in a heterogeneous wireless communications system by in-band distortion compensation at the receive side using a cooperative networking of digital chaos signals operating as an underlay transmission.

Background of Invention

A wireless communication device in a communication system communicates directly (e.g., point to point) or indirectly with other wireless communication devices. For direct/point-to-point communications, the participating wireless communication devices tune their receivers and transmitters to the same channel(s) and communicate over those channels. For indirect wireless communications, each wireless communication device communicates directly with an associated base station and/or access point via an assigned channel.

Each wireless communication device participating in wireless communications includes a built-in radio transceiver (i.e., transmitter and receiver) or is coupled to an associated radio transceiver. Typically, the transmitter includes one antenna for transmitting radiofrequency (RF) signals, which are received by one or more antennas of the receiver. When the receiver includes two or more antennas, the receiver selects one of antennas to receive the incoming RF signals. This type of wireless communication between a transmitter with one antenna and receiver with one antenna is known as a single-output-single-input (SISO) communication.

Well known communications systems provide a range extension on a SISO system by reducing the data rate and, as a result, increase the symbol duration and/or increasing transmit power. However, increasing transmit power can lead to increase interference to other users sharing the network. The preferred method for improved range reception does not lead to decreased network capacity. For popular multicarrier systems, such as SISO WLANs, range improvement is achieved by taking an 802.11a/802.11g signal and cutting the symbol rate. Specifically, the 802.11ah is the range extension an amendment of the IEEE 802.11-2007 wireless networking standard. The goal of the amendment is to optimize the rate vs. range performance of the specific channelization. One proposed method to achieve range extension is by down sampling the 802.11a/802.11g physical layer into 26 channels. When the symbol clock is divided by 26, each symbol duration becomes 104 µsec and the corresponding rate for each subcarrier becomes 12 kbps. Keeping the other system parameters, the same, (e.g. number of data carriers, cyclic prefix percentage, etc.), the bandwidth for a signal is reduced as well the integrated thermal noise power at the receiver. Therefore, for the same transmit power as 802.11a/802.11g, the thermal noise floor is decreased by 10*log 10 (26). This results in a 14 dB "gain" in the sensitivity of the receiver which is equivalent to at least 5 times improvement in the range of an over existing WLAN. What is needed is a communication device, system and method that increases the transmission range of existing WLAN for specific applications without impacting the data rate and adds flexibility to address new markets for high connectivity environments. A suitable invention would improve transmission characteristics of targeted devices without an increase in interference of other nearby the wireless systems and devices. Therefore, what is needed is a method for improved range reception that does not lead to decreased network capacity or increased susceptibility to interference of the wireless device.

Generally speaking, transmission systems compliant with the IEEE 802.11a and 802.11g or "802.11a/g" as well as the 802.11n standards achieve their high data transmission rates using Orthogonal Frequency Division Modulation (OFDM) encoded symbols mapped up to a 64 quadrature amplitude modulation (QAM) multi-carrier constellation. In a general sense, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system. Similarly, multi-code spread spectrum system comprised of perfectly orthogonal high-speed chaos spreading codes transporting independent modulated data can be used to increase its overall throughput or transmission rate of the SISO system. The high-speed "spreading signals" belong to the class of signals referred to as Pseudo Noise (PN) or pseudo-random signal. This class of signals possesses good autocorrelation and cross-correlation properties such that different PN sequences are nearly orthogonal to one other. The autocorrelation and cross-correlation properties of these PN sequences allow the original information bearing signal to be spread at the transmitter.

Transmitters used in the wireless communication systems that are compliant with the aforementioned 802.11a/802.11g/802.11n standards as well as other standards such as the 802.16a IEEE Standard, typically perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a high peak-to-average ratio (PAPR).

Transmitters used in direct sequence spread spectrum (DSSS) wireless communication systems such as those compliant with commercial telecommunication standards WCDMA and CDMA 2000 perform high-speed spreading of data bits after error correction, interleaving and prior to symbol mapping. Thereafter, the digital signal is converted to analog form and frequency translated using conventional RF upconversion methods. The combined signals for all DSSS signals are appropriately power amplified and transmitted to one or more receivers.

Likewise, the receivers used in the wireless communication systems that are compliant with the aforementioned 802.11a/802.11g/802.11n and 802.16a IEEE standards typically include an RF receiving unit that performs RF downconversion and filtering of the received signals (which may be performed in one or more stages), and a baseband processor unit that processes the OFDM encoded symbols bearing the data of interest. The digital form of each OFDM symbol presented in the frequency domain is recovered after baseband downconverting, conventional analog to digital conversion and Fast Fourier Transformation of the received time domain signal. Whereas receivers used for reception for DSSS must de-spread the high signal after baseband downconverting to restore the original information signal band but yields a processing gain equal to the ratio the high speed signal to information bearing signal. Thereafter, the baseband processor performs demodulation and frequency domain equalization (FEQ) to recover the transmitted symbols, and these symbols are then processed with an appropriate FEC decoder, e.g. a Viterbi decoder, to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

To further increase the number of signals which may be propagated in the communication system and/or to compensate for deleterious effects associated with the various propagation paths, and to thereby improve transmission performance, it is known to use multiple transmission and receive antennas within a wireless transmission system. Such a system is commonly referred to as a multiple-input, multiple-output (MIMO) wireless transmission system and is specifically provided for within the 802.11n IEEE Standard and 3GPP LTE Advanced standard. As is known, the use of MIMO technology produces significant increases in spectral efficiency, throughput and link reliability, and these benefits generally increase as the number of transmission and receive antennas within the MIMO system increases.

In particular, in addition to the frequency channels created when using OFDM, a MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different signal-to-noise ratio (SNRs) at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band. Whereas DSSS signal occupies the entire channel band, the number of information bits per modulation symbol (i.e., the data rate) that may be transmitted using the different DSSS sequence for each spatial channel for a particular level of performance.

In the MIMO-OFDM communication system using a typical scheme, a high Peak-to-Average Power Ratio (PAPR) may be caused by the multiple carrier modulation. That is, because data are transmitted using multiple carriers in the MIMO-OFDM scheme, the final OFDM signals have amplitude obtained by summing up amplitudes of each carrier. The high PAPR results when the carrier signal phases are added constructively (zero phase difference) or destructively (±180 phase difference). Notably, OFDM signals have a higher PAPR than single-carrier signals do. The reason is that in the time domain, a multicarrier signal is the sum of many narrowband signals. At some time instances, this sum is large and at other times is small, which means that the peak value of the signal is substantially larger than the average value. Similarly, MIMO-DSSS schemes can have high PAPR for periodic sequence or binary-valued sequence; however, chaos spreading sequences do not exhibit either of these characteristics and therefore have better PAPR performance for SISO and MIMO operations.

Common PAPR reduction strategies include amplitude clipping and filtering, coding, tone reservation, tone injection, active constellation extension, and multiple signal representation techniques such as partial transmit sequence (PTS), selective mapping (SLM), and interleaving. These techniques are often implement at a sampling rate at least four times the baseband signal rate and can achieve significant PAPR reduction, but at the expense of transmit signal power increase, bit error rate (BER) increase, data rate loss, increase in computational complexity, and so on. Further, many of these techniques require the transmission of additional side-information (about the signal transformation) together with the signal itself, in order that the received signal to be properly decoded. Such side-information reduces the generality of the technique, particularly for a technology where one would like simple mobile receivers to receive signals from a variety of base station transmitters. Alternatively, properly designed chaos spreading sequences can be utilized as a phase dithering sequence added to MIMO-OFDM and SISO-OFDM composite carrier signal to reduce PAPR and send side-information about the signal transformation without substantially increasing transmit signal power or degrading the BER at the receiver.

In many regions, there will be the desire for heterogeneous network such as MIMO-OFDM system and Digital Chaos Cooperative Network to share a common band of frequency to alleviate the "spectrum crunch" being experienced by the overwhelming demand for data in the finite radio frequency spectrum. One such approach to handle this coordination or sharing is dynamic spectrum access (DSA). In DSA networks that consider different degrees of interaction between primary users and secondary users, it is desired to control out-of-bound interference (i.e., "emissions") between primary user's transmissions and secondary user's transmissions. In DSA networks including underlay transmission, secondary users may communicate with each other as long as the interference created to the primary user is below some predefined threshold. In this case, the secondary users not only assess whether primary users are transmitting but also how much interference or emissions they will create and whether this will disrupt the primary user's transmission. In a DSA network having overlay transmissions the primary user and the secondary user are permitted to communicate in a cooperative fashion. In any DSA network including underlay transmission and the overlay transmissions, or in DSA networks having a combination of overlay and underlay networking, it is necessary to assess the impact of the presence of secondary users on primary user transmissions for total efficient transmission.

The term "dynamic spectrum access" has broad connotations in spectrum and regulatory body communities to encompass various approaches to spectrum reform. One such reform of interest related to the present invention is the category of Hierarchical Access Model, based on primary and secondary users. In one embodiment of the present invention, the primary user transmission conforms to SISO OFDM system and secondary user transmission conforms to SISO digital chaos cooperative network. In yet another embodiment, the primary user transmission conforms to MIMO or MISO OFDM system with MIMO or MISO digital chaos cooperative network. Typical examples of secondary user operations involve controlling out-of-bounds emissions or interference based on the composite PAPR of a transmitting station engaged in concurrent primary user and secondary user operations. In this instance, "concurrent" may mean that the primary user stream and the secondary stream are transmitting simultaneously out of the same antenna structure. The "composite PAPR" is calculated using signals from each primary user and secondary user and calculating a total PAPR for the collection of primary and secondary users. Secondary user operations include secondary user transmissions in a dynamic spectrum access network (DSA). Overlay signal transmissions and underlay signal transmissions are examples of secondary user transmissions found in DSA networks, which can be controlled based on evaluation of the composite PAPR and one other constraint according to this invention.

The continually increasing reliance on multi-carrier SISO and especially MISO wireless forms of communication creates reliability, PAPR and privacy problems. Data should be reliably transmitted from a transmitter to a receiver. In particular, the communication should be resistant to noise, interference, and possibly to interception by unintended parties. Many PAPR reduction techniques lead to distortion the transmit signal characteristics, which is quantifiable by Error-Vector-Magnitude (EVM) and out-of-band spectral emissions. A subject of this invention is to minimize the effect on EVM and out-of-band spectral emission while reducing PAPR, which allows use of higher order modulation scheme to result in higher spectral efficiencies for the network. The error vector magnitude is a measure used to quantify the performance of a digital radio transmitter or receiver. A signal sent by an ideal transmitter or received by a receiver would have all constellation points precisely at the ideal locations, however various imperfections in the implementation (such as carrier leakage, low image rejection ratio, phase noise etc.) cause the actual constellation points to deviate from the ideal locations. Informally, EVM is a measure of how far the points are from the ideal locations. An error vector is a vector in the real and imaginary plane between the ideal constellation point and the point received by the receiver. In other words, it is the difference between actual received symbols and ideal symbols. The average power of the error vector, normalized to signal power, is the EVM. For the percentage format, root mean square (RMS) average is used; that is, the square root of the arithmetic mean of the squares of the signal amplitudes, or the square of the function that defines the continuous waveform. In comparison, out-of-band spectral emission is predicated on the definition of what is considered the occupied bandwidth of the incoming signal. One common definition used in the art is the 99% occupied bandwidth, which is defined as the bandwidth that contains 99% of the total power of the signal. Governing regulatory body of the countries define a spectrum mask of allowable power relative to the total power that a device may transmitter in specified frequency bandwidths at certain offsets from the center of the occupied bandwidth. The out-of-band spectral emission is defined as the accumulative measured power starting at a frequency offset of 0.5 times the occupied or necessary bandwidth and extends up to 2.5 times the occupied or necessary bandwidth, respectively. In the present invention, a fitness function is constrained by the allowable over-drive level while meeting the linearity mask, which is adaptively estimated by an adjacent channel leakage ratio (ACLR) sensing algorithm, incorporated in the transmitter, that utilizes input drive signal power to the PA.

In the last few years there has been a rapidly growing interest in ultra-wide bandwidth (UWB) impulse radio (IR) communication systems. These systems make use of ultra-short duration pulses that yield ultra-wide bandwidth signals characterized by extremely low power spectral densities. UWB-IR systems are particularly promising for short-range wireless communications as they combine reduced complexity with low power consumption, low probability of detection (LPD), immunity to multipath fading, and multi-user capabilities. Current UWB-IR communication systems employ pseudo-random noise (PN) coding for channelization purposes and pulse-position modulation (PPM) for encoding the binary information.

Others have proposed periodic sequences of pulses in the context of chaos-based communication system. Additional work has relied upon the self-synchronizing properties of two chaotic systems. In such a system, data is modulated into pulse trains using variable time delays and is decodable by a coherent receiver having a chaotic generator matched to the generator used in the transmitter. Such system is known in the art as a Chaotic Pulse Position Such chaotic dynamical systems have been proposed to address the problem of communication privacy. Chaotic signals exhibit a broad continuous spectrum and have been studied in connection with spread-spectrum applications. The irregular nature of a chaotic signal makes it difficult to intercept and decode. In many instances a chaotic signal will be indistinguishable from noise and interference to receivers not having knowledge of the chaotic signal used for transmission. In the context of UWB systems the use of non-periodic (chaotic) codes enhances the spread-spectrum characteristics of the system by removing the spectral features of the signal transmitted. This results in a lower probability of interception/detection (LPI/LPD) and possibly less interference towards other users. This makes the chaos-based communication systems attractive.

There remains a need for improved chaotic coding/modulation methods to produce such attractive communication systems. One prior art, U.S. Pat. No. 6,882,689, issued Apr. 15, 2005 to Maggio et al., attempts to improve chaotic coding using pseudo-chaotic coding/modulation method that exploits the symbolic dynamics of a chaotic map at the transmitter to encode data. The method uses symbolic dynamics as "coarse-grained" description of the evolution of a dynamic system. The state space is partitioned and a symbol is associated with each partition. The Maggio invention uses a trajectory of the dynamic system and analyzes it as a symbolic system. A preferred transmitter of the Maggio prior art accepts digital data for coding and the digital data is allocated to symbolic states according to a chaotic map using a shift register to approximate the Bernoulli shift map acting as a convolution code with a number of states equal to the symbolic states defined on the chaotic map. The pseudo-chaotically coded data is converted to analog form and modulated into synchronization frames in a transmitted signal.

The Maggio prior art has limitations in that it uses only one chaos map (e.g., Bernoulli shift map), that is generated based on the data transmitted. By confining the mapping to Bernoulli shift, information that is repeated in each transmission or a repeat symbol can be recognized after observing the waveform over an extended period of time. Once compromised, all future data will be detectable and decodable by a hostile system.

Another prior art system that teaches a chaotic coding/modulation method is described in U.S. application Ser. No. 13/190,478 ("the '478 Patent"), which is commonly invented by the present inventor, and incorporated herein by reference in its entirety. The '478 Application teaches a system, device and method for wirelessly transmitting data via a digital chaos spreading sequences. The '478 Application system teaches constructing and storing a digital chaos spread code sequence in a volatile memory in both the transmitter and the receiver. Information corresponding to the chaos spread code sequence used to transmit the digital information is received by a receiver for identifying which chaos spread code sequence to use to retrieve the coded information. The '478 Application system further eliminates the reliance on the Bernoulli shift map, and therefore teaches a system which is less detectable by a hostile system.

While the system of the '478 Application solves many of the problems in the prior art, the system has limited applicability to SISO systems. The receiver disclosed in the '478 Application detects and processes one data stream for a single user even in the presence of other users or external interference. The '478 Application therefore would not be useful for transmission systems that jointly processes a plurality of signals detected at the receiver. For example, the joint processing of multiple signals allows for increased capacity and enhanced reception of a MIMO system.

Generally, the most fundamental issue in wireless communication lies in how efficiently and reliably data can be transmitted through a channel. The next generation multimedia mobile communication system, which has been actively researched in recent years, requires a high speed communication system capable of processing and transmitting various forms of information such as images and wireless data, different than an initial communication system providing a voice-based service.

Then according to the prior art, what is needed is a system and method that does not sacrifice data rate in favor of range, provides increased robustness, while improving LPI/LPD. A system and method is further needed that does exhibit the same positive improvements in a system detecting and receiving multiple signals.

Moreover, cooperation amongst wireless mobile units is often required in mobile ad-hoc networks (MANETs) to support the arbitrary organization of mobile units as the wireless mobile units are allowed to move randomly within a packet radio network. The nodes (e.g., wireless mobile units) of the MANET network must find a way to communicate without knowledge of the network topology that is the foundation for requiring cooperation among the nodes. The nodes of the network must learn the transmit and receive schedules of neighboring nodes to communicate. The communications between nodes is complicated by the mobile nature of the nodes. Discovery of neighboring nodes' schedules entails individual group formations, membership assignment, and broadcast messaging capability to disseminate the essential health of the group to members and, potentially, non-members for certain circumstance. The rate of resolving the scheduling must be fast and bandwidth efficient such that the network can be stabilized yet updated often enough such that the information collected has not become stale. Therefore, the lightness in overhead and relative speed of generating the channel schedules become important factors in the design of the Media Access Control (MAC) layer in cooperative network. A number of the unique characteristics of digital chaos signal structure simplifies these operations compared to prior art. In particular, the property that several digital chaos signals can simultaneously exist on the medium without causing a collision greatly reduces the time need to disseminate group health or status information to all members of the group and hence changes the method of discovery for the schedule of neighboring nodes. Another property that help reduces the number of exchanges in handshaking between nodes is that a unique broadcast digital chaos signature derived from a device's unique identifier, such as unique 15-digit IMEI or 'International Mobile Equipment Identity' number, is preload in the devices non-volatile memory. Since the IMEI is unique for each cellular device, the association and authentication process can be performed simpler and more secure than the prior art for similar process steps in other radio protocols. Lastly, the orthonormal property of the digital chaos signals allows channel sensing to be perform on a per user basis as well as the total users occupying the media at the time.

SUMMARY OF INVENTION

The present invention teaches improvements not found in the prior art. In one aspect, the invention teaches a method of signal amplitude recovery for one user of a heterogeneous cooperative network using the in-band underlay side channel of a second user, wherein:
  a. an oversampled multi-carrier SISO, MISO or MIMO baseband signal at the transmit experiences several amplitude values exceeding a specific threshold,
  b. by oversampled baseband signal, what is meant is the sampling instances of the baseband signal at captured at a rate of at least four times the highest frequency component of constituent baseband signal,
  c. generating a sparse vector containing the difference between the threshold values and signal amplitude at the time instance when the signal amplitude exceeds the threshold and zeros at all other time instances,
  d. further processing the sparse vector through a signal partition algorithm that extracts the nonzero samples and their position locations in the sparse vector,
  e. generating binary strings to represent the nonzero position location and the nonzero clipping amplitudes, f. sending the nonzero samples and their position locations information using underlay digital chaos signals along with the original unclipped primary user signal.

In one aspect, the nonzero samples and their position locations information are sent at a sub-Nyquist transmission rate compared to the original users in the same band frequency band.

In yet another aspect of the present invention, the position location information is first processed with a hash function and a hash key is transmitted in lieu of the actual position location information. Hash key collisions are practically unavoidable when hashing a random subset of a large set of possible keys. For example, if 2,450 keys are hashed into a million buckets, even with a perfectly uniform random distribution. According to the famous "birthday problem", there is approximately a 95% chance of at least two of the keys being hashed to the same slot.

In yet another aspect, the load factor for a hash, defined as n/k—where n is the number of buckets and k is the number of keys—is predetermined and lower bounded by at least order of magnitude greater than the threshold for Complementary Cumulative Distribution Function (CCDF) of the PAPR. For instance, an industry standard is to use the PAPR less than or equal to $10^{-4}$ threshold of the CCDF of the PAPR. Hence, a million buckets of time position location with require 1000 hash keys (e.g., $10 \times 10^{-4} \times 10^6$).

In a preferred embodiment of this invention, the spreading for the digital chaos secondary user is equal to the floor of the ratio of the frame size of the primary users to the number of hash keys.

In yet another aspect, the invention teaches a method of sending clipping amplitudes and positions at a power level significantly lower than the original signal such that the over average power of the composite signal is not substantially different than the original alone. By substantially different than the original signal, what is meant that resulting EVM for the adding the sparse clipping amplitude vector falls within the tolerance for a communication standard. For instance, modulation formats of BPSK, QPSK, 16QAM and 64QAM often have EVM specifications of 23%, 12%, 6% and 3%, respectively.

In an exemplary embodiment, a k-sparse signals are the nonzero samples of a signal s(n) having N samples (i.e., n=0, 1, . . . , N−1), wherein all N samples of signal s(N) are zeros except for k<<N. The degree of sparseness is k/N. It is well known that ordinarily, when k≤(5%-10%) of N, signal s(n) can be recovered using compressive sensing techniques.

In yet another aspect, the invention teaches a method of association clipping with scaled version of preloaded digital chaos sequences, whose index is transmitted in lieu of the clipping amplitudes.

In another aspect of the invention, a preloaded reserved broadcast "beacon" frame is used to update which group of stored digital chaos sequences and scaling to use to estimate the clipping amplitude. The invention further teaches transmission of a beacon frame encoded with parameters to locally generate a new set of replacement clipping amplitudes.

In another aspect of the invention, when the nodes receive "beacon frames" from a network manager or coordinator with an updated clip field set in the signal field of the packet, the node updates its local indexes associated with clipping amplitude memory or table to align with payload information in the "beacon frame". In yet another aspect of the invention, a "beacon frame" has a reset clip field set in the signal field of a transmission packet and all receiving nodes use the reset clip field in the payload information to locally generate a new set of digital chaos sequences to serve as the clipping amplitude memory or table.

In another aspect of the invention, the broadcast "beacon frames" is comprised of digital chaos spreading sequence protected with on-processor encryption algorithm preloaded in the devices non-volatile memory, wherein the on-processor encryption algorithm uses a device's unique identifier, such as unique 15-digit IMEI or 'International Mobile Equipment Identity' number, to generate on-processor encryption keys.

In another aspect of the invention, a plurality of constructed digital chaos spreading code are stored in a volatile memory for use as beacon broadcast digital chaos signals over a wireless transmission, comprising:

the modulating a frame of the data signal using a reserved digital chaos sequence for the purposes of ubiquitous reception by at least one of a priori predefined user groups known to the receiver and communicated by the network manager or coordinator, wherein the generating of the digital chaos sequence comprises, recording a featureless waveform having nonlinear dynamics in a memory, buffering the featureless waveform, sampling a fixed number of samples for a particular spreading factor of said buffered featureless waveform, storing a varied quantity of groups of the fixed number of samples for a particular spreading factor to form the entries of the database, such that the groups of fixed number of samples for a particular spreading factor are distinct with low cross-correlation amongst the groups, and then processing all the groups segments using Gram-Schmidt process, wherein signal processing the beacon broadcast digital chaos signals is independent of membership or non-membership to a particular group class, wherein the featureless waveform is one of at least one of a native analog chaos waveform, aperiodic waveform, or computer simulated non-linear dynamics of a deterministic mapping characteristic, wherein each beacon broadcast signal contains one of the plurality of distinct data signals includes control bits in a pre-amble of the plurality of distinct data signals.

Each member of a group has allocations for volatile memory for storing multiple constructed digital chaos spreading sequences of a length N. The digital chaos memory allocations may be partitioned into M number of groups of equal number of N-length digital chaos spreading code subsequences. Group members are assigned a group ID indexing the stored memory. The group memory may be indexed in a sequential order. The sequential ordering can be a known order, such as formal ordering of natural numbers (e.g., 1, 2, 3, . . . ). However, the ordering does not need to be consecutive. The only requirement for the index number for the current user is that it sequences the $p^{th}$ group of memory locations associated with group id p stored in at both the transmitter and receiver in a manner such as to provide a one-to-one correspondence between selected digital chaos spreading code sequence at the one group member transmitting side and another group member index at the receiving side for detected and message recovery.

In yet another aspect, the invention discloses a data payload including pre-ambles, the pre-ambles are constructed so that multiple embedded signals can be detected at one or more locations without interference with native performance of each constituent signal. Additionally, the mid-ambles are constructed so that multiple embedded signals can be detected at one or more locations without interference with native performance of each constituent signal. The data payload may be comprised of at least one signal that is not encapsulated in a digital chaos signal and at least one signal that is encapsulated in a digital chaos signal, where both the non digital chaos encapsulated signal and the digital chaos encapsulated signal are part of a cooperative network protocol. The pre-amble and mid-amble are also constructed by repeating the digital chaos sequence of sign flipping a copy of the digital chaos sequence in the next symbol period.

In still another aspect, the invention teaches a transmitter system including a volatile memory storing a plurality of digital chaos sequence.

In still another aspect, the invention teaches a receiver system including a volatile memory storing a plurality of digital chaos sequence.

In still another aspect, the invention teaches a system for transmitting data using a digital chaos spreading sequence.

In another aspect, the invention discloses a method for embedding control information in pre-ambles and mid-ambles for a network based on relative amplitude over the replication period. The control information is conveyed using a pre-selected digital chaos sequence.

In yet another aspect, the invention teaches a method for selecting a digital chaos waveform for use in a digital chaos spread sequence.

In yet another aspect the invention teaches a method for embedding multiple disparate communication signals within digital chaos communication waveforms originating from a single antenna subsystem. The method according to this aspect can include multiple antenna elements for introducing low probability intercept (LPI) and low probability of detection (LPD), reduced peak-to-average ratio (PAPR), and increased network system capacity.

The present invention teaches a system, device and method for wirelessly transmitting an aggregation of data via a multiplicity of digital chaos spreading sequences. In one aspect, the invention teaches the use of a plurality a priori constructed and stored digital chaos spreading code sequences for data aggregation of digital signals and digital information within multiple digital chaos waveforms. In the context of this invention, data aggregation is any method or technique whereby several different data streams—whether for a single user or multiple users—are collected or aggregated and processed together in a single payload at a transmitter or receiver. Examples include, but not limited, multiple chaos spreading sequences assigned to a single user to increase their transmission rate through at least one transmit antenna; a cooperative network scheme whereby all users received within a specified time period are detected together, forwarded together (i.e., synchronized) as a single augmented payload through at least one transmit antenna.

In another aspect of the invention a plurality of digital chaos waveforms is chosen based on the intended application or operation. For example, a plurality of digital chaos waveforms may be chosen according to characteristics such as unity peak autocorrelation, low autocorrelation side lobes, very low cross-correlation, and low PAPR at the transmitter to increased capacity by multiple simultaneous detection of digital signal and digital information with multiple digital chaos waveforms.

In another aspect of the invention, a plurality of constructed digital chaos spreading codes are stored in a volatile memory. The constructed digital chaos spreading codes may be stored in the transmitter and in the receiver. The constructed digital chaos spreading codes may be generated as is taught in, for example U.S. Pat. No. 8,873,604, titled "Method and Apparatus for Multiple Signal Aggregation and Reception in Digital Chaos Network" and issued Oct. 28, 2014 to Terry.

In another aspect of the invention, within a single group, the volatile memory may include distinct groups of memory locations for storing a constructed digital chaos spreading sequences of a length N. The digital chaos spread sequences may be partitioned into M number of groups of digital chaos spreading code subsequences. Users are assigned a group ID indexed the stored in memory. The groups may be indexed in a sequential order. The sequential ordering can be a known order, such as formal ordering of natural numbers (e.g., 1, 2, 3, . . . ). However, the ordering does not need to be consecutive. The only requirement for the index number for the current user is that it sequences the $p^{th}$ group of memory locations associated with group id p stored at both the transmitter and receiver such that when a one-to-one correspondence occurs between transmitter and the receiver, a selected digital chaos spreading code sequence transmitted by the transmitter and is detected and recovered at the receiver using the index number.

In still another aspect, the invention discloses a data payload having a pre-amble and a mid-amble, where the pre-amble and the mid-amble are constructed so that multiple embedded signals can be detected at one or more locations without interference with native performance of each constituent signal. The data payload may be comprised of at least one high PAPR signal and at least one other signal that is part of a common network protocol. The pre-amble and mid-amble may also be constructed by repeating the digital chaos sequence of a sign flipped copy of the digital chaos sequence in the next symbol period. In another embodiment, the preamble and the mid-amble may also be constructed by repeating the digital chaos sequence and differentially encoding information onto the next symbol period.

In another aspect, the invention discloses a data payload having pre-ambles and mid-ambles, the pre-ambles and mid-ambles are constructed so that the data payload may be augmented for the inclusion of a signal field and a symbol delimiter within each of aggregated digital signals and digital information within multiple digital chaos waveforms so that the time of arrival of each constituent signal, part of the aggregated digital signals can be identified accurately and reliably. A signal field is generated that contains information on the operational mode of the receiver and contains at least one information of length of the digital signal and digital information of the transmitting data and rate of said. Further, a signal field is comprised of parity information for protection against and detection errors of other information within the signal field.

In still another aspect, the invention teaches a transmitter system with an augmented payload as described above.

In still another aspect, the invention teaches a receiver system with an augmented payload according to exemplary embodiments of the invention.

In still another aspect, the invention teaches a system for transmitting multitude digital signals and digital information using multiple digital chaos waveforms.

In yet another aspect, the invention teaches a system for receiving multitude digital signals and digital information using multiple digital chaos waveforms.

In still another aspect, the invention teaches a receiver system capable of detecting the arrival times of each of the augmented payload signals of multitude of digital signals and digital information using multiple digital chaos waveforms In still another aspect, the invention teaches a receiver system capable of processing each signal field of multitude of digital signals and digital information with multiple digital chaos waveforms and configuring the remaining receiver subsystem to recover each of digital signal and digital information using multiple digital chaos waveforms.

In yet another aspect, the invention teaches a method for improving multi-user detection as described above, wherein the received multitude of digital signals and digital information with multiple digital chaos waveforms undergo a process to separate the aggregated transmitted digital signal and digital information into streams projected on the null space of all users except itself. The separation of the aggregated transmitted digital signal and digital information is performed for each of the identified digital signal and digital information part of the received aggregated digital signal and digital information prior to processing by the dispreading subsystem.

In yet another aspect the invention teaches a method for aggregating and embedding multiple disparate communication signals within digital chaos communication waveforms originating from a multiple antenna system. The antenna elements of the multiple antenna system need not be co-located. The antenna elements do need to work in cooperation for introducing low probability intercept (LPI) and low probability of detection (LPD) signal, reduced peak-to-average ratio (PAPR) of all constituents, and increased network system capacity through multiple independent data and side-channel information for improved detection for at least one concurrent non-digital chaos signal at the receive side.

BRIEF DESCRIPTION OF DRAWINGS

A more complete understanding of the present invention may be derived by referring to the various embodiments of the invention described in the detailed descriptions and drawings and figures in which like numerals denote like elements, and in which.

DETAILED DESCRIPTION

Figure 1:
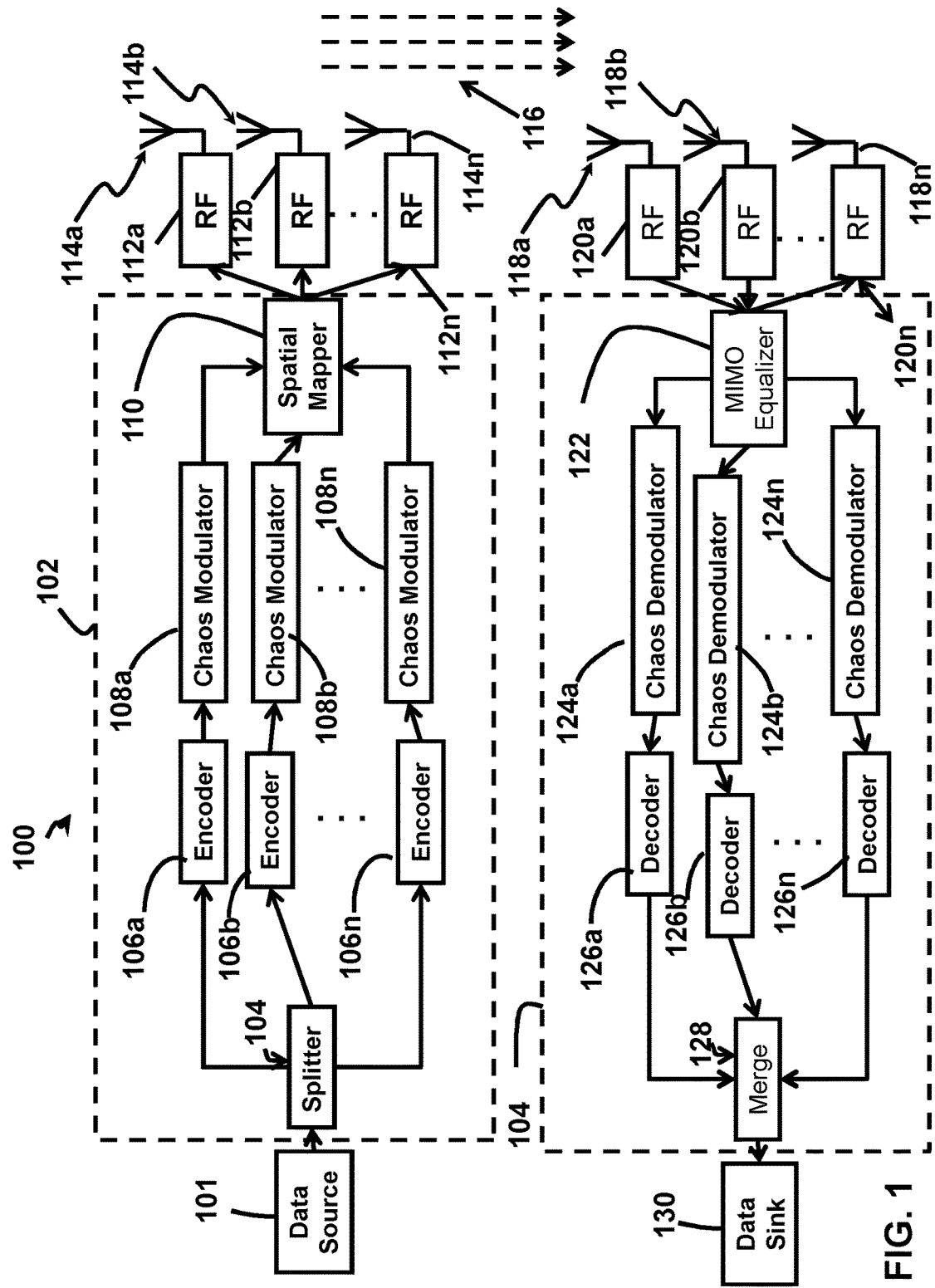
FIG. 1 is an exemplary multiple-input-multiple output (MIMO) wireless transmission system that may be used with the various embodiments of the invention.

The description of exemplary embodiments and best mode of the invention herein makes reference to the accompanying drawings and flowcharts. While these exemplary embodiments are described in sufficient detail to enable those skilled in the art to practice the invention, it should be understood that other embodiments may be realized and that logical and mechanical changes may be made without departing from the spirit and scope of the invention. Thus, the description herein is presented for purposes of illustration only and not of limitation. For example, the steps recited in any of the method or process descriptions may be executed in any order and are not limited to the order presented.

The present invention may be described herein in terms of functional block components and various processing steps. It should be appreciated that such functional blocks may be realized by any number of hardware and/or software components configured to perform the specified functions. For example, the present invention may employ various integrated circuit (IC) components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a scripting language, such as JavaScript, VBScript or the like. For a basic introduction of cryptography, please review a text written by Bruce Schneider which is entitled "Applied Cryptography: Protocols Algorithms, And Source Code In C," published by john Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity; conventional wireless data transmission, transmitter, receivers, modulators, base station, data transmission concepts and other functional aspects of the systems (and components of the individual operating components of the systems) may not be described in detail herein. Furthermore, the connecting lines shown in the various figures contained herein are intended to represent exemplary functional relationships and/or physical couplings between the various elements. It also should be noted that many alternative or additional functional relationships or physical connections may be present in a practical electronic transaction or file transmission system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

To simplify the description of the exemplary embodiment, the invention is described as being able to be used with single-input-single-output (SISO) and multiple receive antenna systems, such as, single-input-multiple-output (SIMO), multiple-input-single-output (MISO), and multiple-input-multiple-output (MIMO) wireless transmission systems. For example, the invention may be used with a SISO DSSS systems and MIMO DSSS systems as well.

It will also be appreciated that many new applications of the present invention could be formulated. For example, the present invention could be used to facilitate any conventional wireless communication medium. Further, it should be appreciated that the network described herein may include any system for exchanging data or transacting business, such as the Internet, an intranet, an extranet, WAN, WLAN, WPAN, HAN, Ad hoc Networks, mobile ad hoc networks (MANET), satellite communications (SATCOM), and/or the like.

FIG. 1 is an exemplary block diagram of a MIMO wireless system 100 with which the invention may be used. Exemplary MIMO wireless system 100 may be comprised of transmitter 102 for receiving a data source 101 (information signal 101) and transmitting the data source 101 to a receiver 104 over a transmission channel 116. Transmitter 102 may include a signal splitter 104 for receiving data source 101 and splitting the data source 101 into distinct streams of data source 101. Each of the distinct streams of data source 101 may be independently received by, and encoded by, multiple encoders 106a-n. Transmitter 102 may include multiple chaos modulators 108a-n for receiving the encoded data source and chaos modulating the encoded data source to produce multiple chaos modulated data source signals. Each of the encoded data source signals is digitally modulated and spread using a digital chaos spreading code. In one embodiment, each encoded data source signal is digitally modulated and spread with a digital chaos spreading code retrieved from a digital chaos sequence memory as discussed more fully below. In another exemplary embodiment, transmitter 102 may not include a splitter 104. Alternatively, data source 101 may be provided to encoders 106a-n.

The multiple chaos modulated data source signals may then be spatially mapped (e.g., spread over multiple spatial channels) by spatial mapper 110. The spatially mapped multiple chaos modulated data source signals may then be provided to multiple radio frequency oscillators systems 112a-n prior to transmitting the spatially mapped multiple chaos modulated data source signals over the multiple spatial communication channels 116 via multiple antennas 114a-n.

The spatially mapped multiple chaos modulated data source signals may be received by receiver 104 at multiple antennas 118a-n. The spatially mapped multiple chaos modulated data source signals may be recovered from the channel 116 using multiple radio frequency receiving systems 120a-n. RF receiver system 120a-n may recover the summed chaos modulated data source signal from the signal transmitted over channel 116. For example, RF receiver system 120a-n may recover the summed chaos modulated data source signal from the signal transmitted over channel 116 using any conventional methods for recovering a data signal from a wireless channel as are found in the art. For example, RF receiver system 120a-n may recover the transmitted signal by down converting the transmitted signal to baseband analog format and converting the baseband analog signal to baseband discrete signal.

Receiver 104 may further include a MIMO equalizer 122 for separating the spatially mapped multiple chaos modulated data source signals produced by the channel. MIMO equalizer 122 may separate the channel signals according to estimates of each channel amplitudes and phases characteristics associated with each path traverse by the spatially mapped modulated data source signal to produce received baseband modulated signals. The received baseband modulated signals may then be chaos demodulated by multiple chaos demodulators 124a-n according to data source signal channel. The multiple chaos demodulated data source signals may then be decoded by multiple decoders 126a-n. The multiple decoded chaos demodulated data source signals may then be merged by a signal merger 128 for combining the multiple data source signals into a single merged signal. In one embodiment, the merged signal may be a copy of the data source 101. Receiver 104 may provide the merged signal to a data sink 130.

Splitter 104, encoders 106a-n, spatial mapper 110, MIMO equalizer 122, decoders 126a-n, signal merger 128, and RF oscillator systems 112a-n, RF receiving system 120a-n may be of conventional construction and operation as is found in the art. The operation and construction of chaos modulators 108an and demodulators 124a-n are discussed more fully below.

Figure 2:
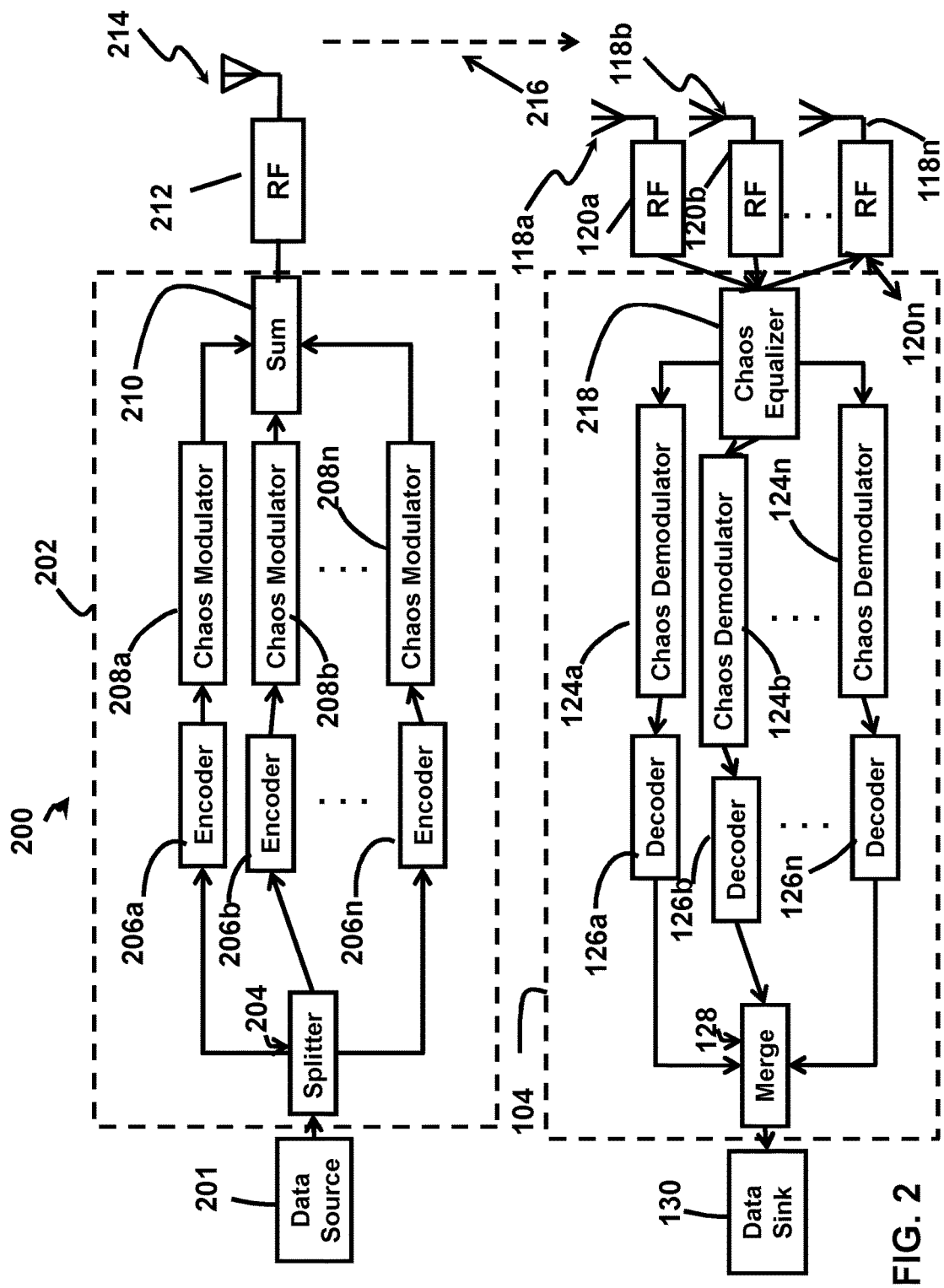
FIG. 2 is an exemplary single-input-multiple output (SIMO) wireless transmission system that may be used with the various embodiments of the invention.

FIG. 2 is an example of an embodiment of a SIMO wireless transmission system 200 with which the invention may be used. As shown in FIG. 2, receiver 104 communicates with a transmitter 202 having a single antenna 214. Transmitter 202 contains similar elements as are found in transmitter 102, which have similar operation as is described above. For example, splitter 204, encoders 206a-n, chaos modulators 208a-n, RF oscillator system 212, and antenna 214 have similar construction and operation as is described with respect to splitter 104, encoders 106a-n, chaos modulators 108a-n, RF oscillator systems 112a-n, RF receiving system 120a-n, and antennas 114a-n. Particularly, data source 201 (information signal 201) is split into multiple distinct streams of data source. The multiple distinct streams of data source are received by multiple encoders 206a-n to produce multiple encoded data source signals. Multiple chaos modulators 208a-n may receive and chaos modulate the encoded data source signals to produce multiple chaos modulated data source signals. Each of the encoded data source signals are digitally modulated and spread using a digital chaos spreading code. In one embodiment, each encoded data source signal is digitally modulated spread with a digital chaos spreading code retrieved from a digital chaos sequence memory as discussed more fully below.

The multiple chaos modulated data source signals may then be summed at a signal summer 210 prior to being provided to a RF oscillator system 212. Transmitter 202 may then transmit the summed chaos modulated data source signal via an antenna 214. Transmitter 202 may transmit the summed chaos modulated data source signal via a communication channel 216. The chaos modulated data source signal may be received by receiver 104 at antennas 118a-n. The summed chaos modulated data source signal may be received by multiple RF receiver system 120a-n. RF receiver system 120a-n may recover the summed chaos modulated data source signal from the signal transmitted over channel 216, in similar manner as discussed with respect to FIG. 1. Chaos equalizer 218 may receive the multiple summed chaos modulated data source signals and reassemble the data source signal according to the transmitted packets.

Figure 3:
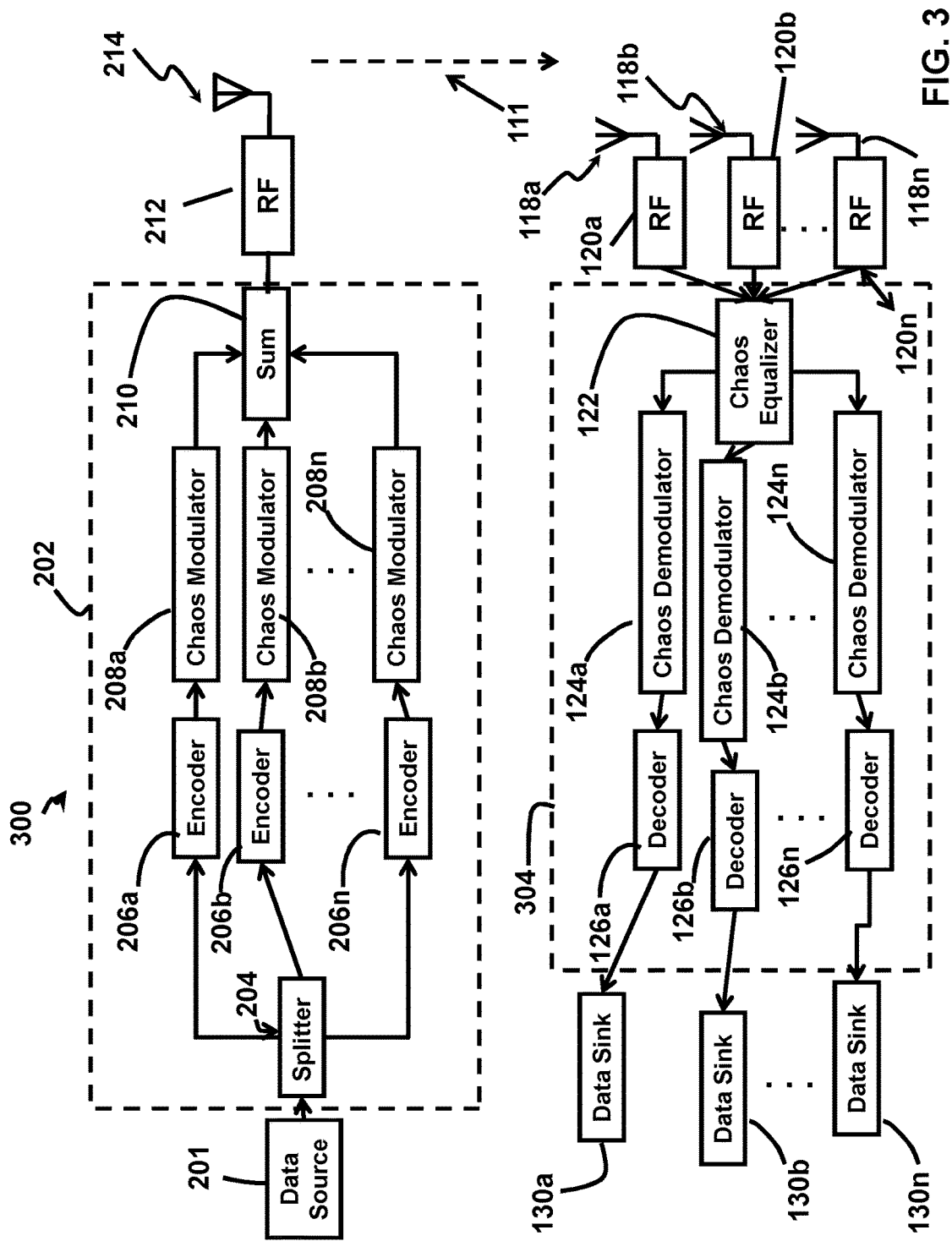
FIG. 3 is another exemplary single-input-multiple output (SIMO) wireless transmission system that may be used with the various embodiments of the invention.

FIG. 3 is another example of another SIMO wireless transmission system 300 with which the invention may be used. According to SIMO wireless transmission system 300, transmitter 202 is of similar description and operation described with respect to FIG. 2, Receiver 304 is of similar operation and description as described with FIG. 2. Receiver 304 for FIG. 3 may provide the multiple decoded chaos demodulated data source signals to multiple data sinks 103a-n, which may be at distinct and separate locations.

In alternate embodiments, receiver 304 may comprise multiple independent receivers where each receiver may include a chaos demodulator 124. Similarly, transmitter 202 may comprise multiple independent transmitters, where each transmitter includes a chaos modulator 208a-n.

Figure 4:
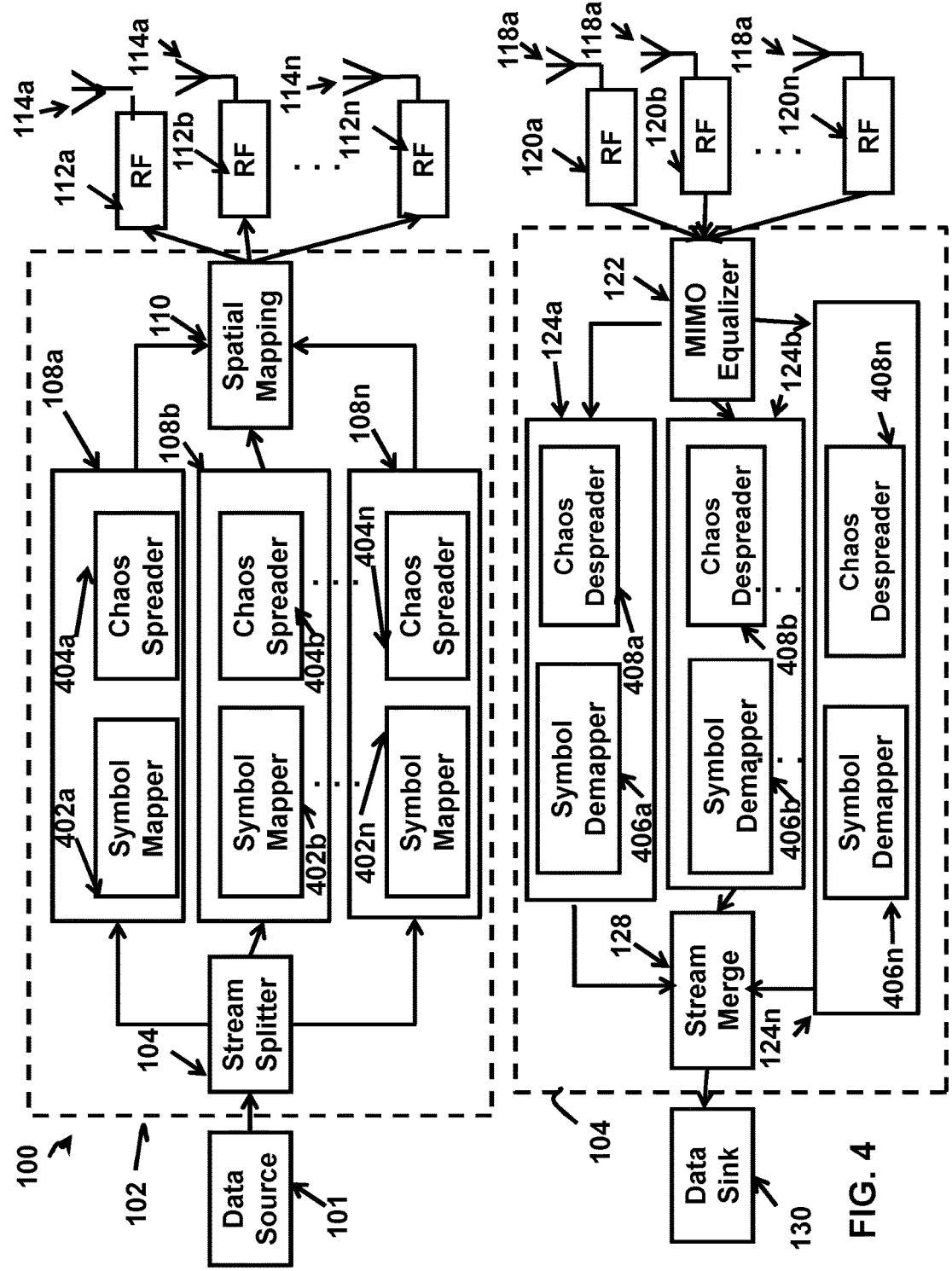
FIG. 4 is another exemplary MIMO wireless transmission system that may be used with the various embodiments of the invention.

FIG. 4 depicts MIMO wireless transmission system 100 in further detail. As previously noted, chaos modulators 108a-n chaos modulates the data source signal to produce multiple chaos modulated data source signals. A shown in FIG. 4, chaos modulator 108a-n may include a symbol mapper 402a and a chaos spreader 404a. In some embodiments, the chaos modulator 108a-n may not include a symbol mapper 402a-n. Symbol mapper 206a-n may be a conventional symbol mapper including conventional transmitter components such as a scrambler, differential encoder, symbol generator or the like. Symbol mapper 206a-206n further transmits the respective signals to chaos spreader 404a-n. Chaos spreader 404a-n may modulate the data source signal using a digital chaos spreading code sequences formed using a method included in FIG. 8. The chaos modulator 108a may chaos modulate the data source signal before the data source signal is spatially mapped (spatial mapper 402) and upconverted (RF oscillator systems 112a-n) prior to being transmitted to receiver 104, via antennas 114a-n.

According to FIG. 4, receiver 104 receives the data source signal transmitted by transmitter 102. The data source signals may be downconverted at RF receiver systems 120a-n and provided to MIMO equalizer 122. MIMO equalizer 122 separates the data source signals according to spatial channels (i.e., channel 111) and recovers the transmitted symbols and provides the signals chaos demodulators 124a-n. In one embodiment of receiver 104, Chaos demodulators 124a-n may include a symbol demapper 46a-n and a chaos despreader 408a-n. In one embodiment, chaos demodulators 124a-n may not include a symbol demapper 402a-n. Chaos despreader 408a-n uses a digital chaos sequence code for despreading the data source signal as noted below. The chaos de-spread signal may then be symbol demapped by a symbol demapper 406a-n for recovering the transmitted distinct streams of data source signal.

Figure 5:
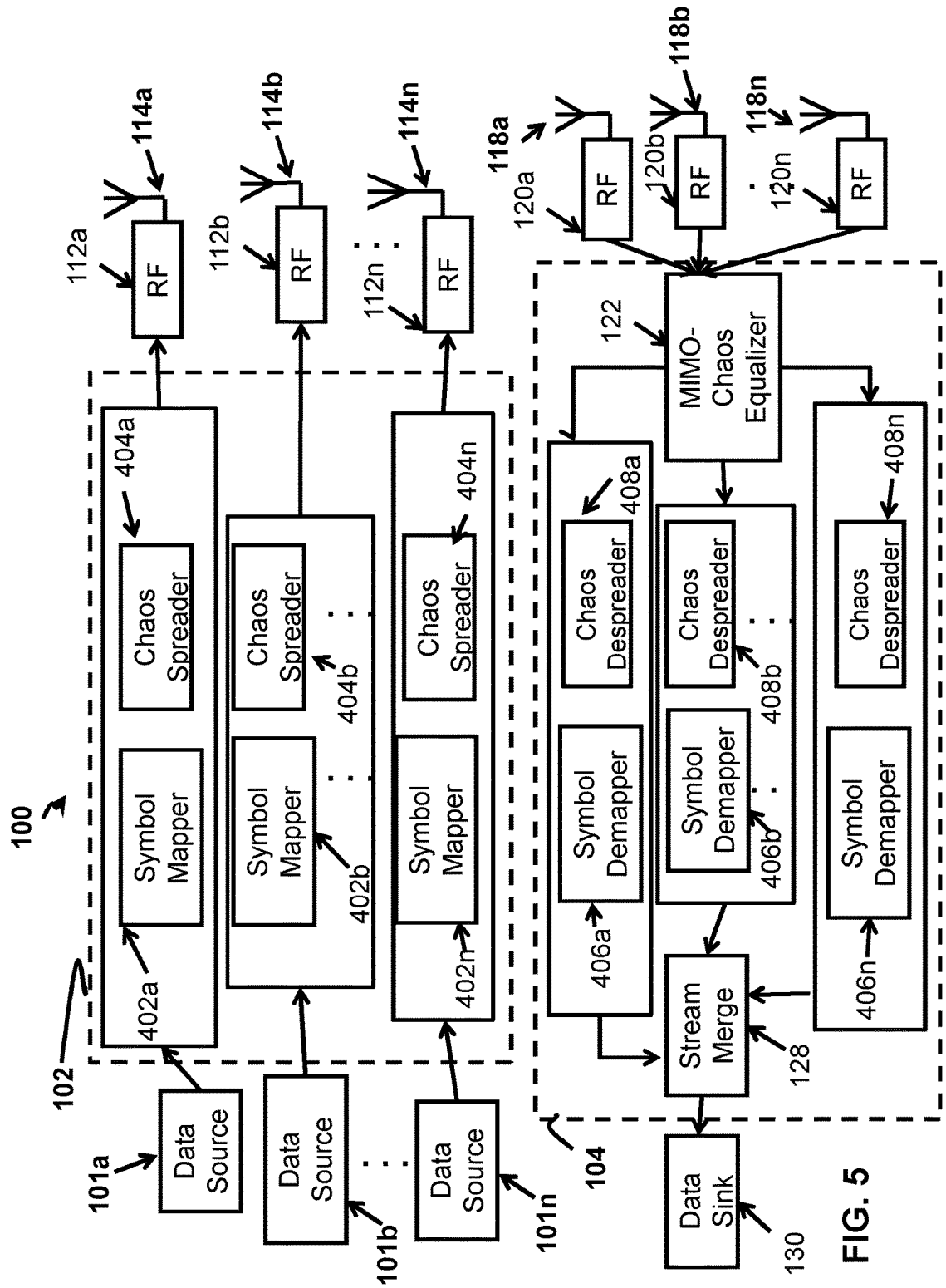
FIG. 5 is another exemplary MIMO wireless transmission system that may be used with the various embodiments of the invention.

FIG. 5 is another embodiment of transmitter 102, As shown, transmitter 102 may not include a splitter 104. In this embodiment, transmitter 102 may not include a spatial mapper 110. Alternatively, data source 101 may be provided to encoders 106a-n. In yet another embodiment, data source signal 101a-n may be chaos spread at a chaos spreader 404a-n and provided to RF oscillator systems 112a-n prior to being transmitted to receiver 104. Receiver 104 processes the received data source signal in similar manner as is described with respect to FIG. 4.

Figure 6:
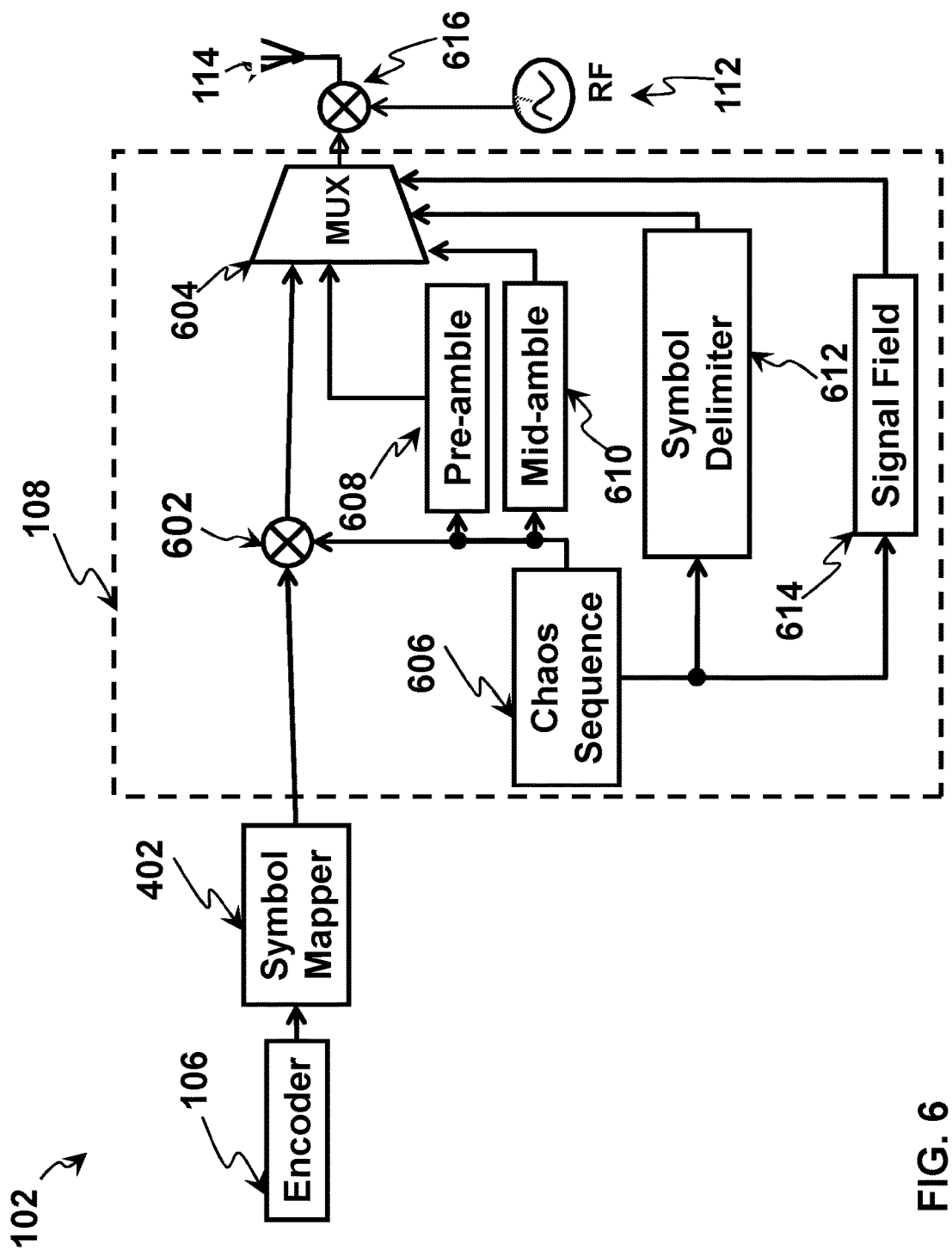
FIG. 6 is an exemplary wireless transmitter in accordance with various embodiments of the invention.

FIG. 6 depicts another exemplary embodiment of a transmitter 102 useful with the invention. According to FIG. 6, transmitter 102 includes a channel encoder 106, a symbol mapper 402, multiplexer 604, RF oscillator system 112 wherein multiplexer 604, channel encoder 106, symbol mapper 402, multiplexer 604 and RF oscillator system 112 that are traditional elements as are found in the prior art. As such, their construction and operation is not discussed in here for brevity.

Figure 8:
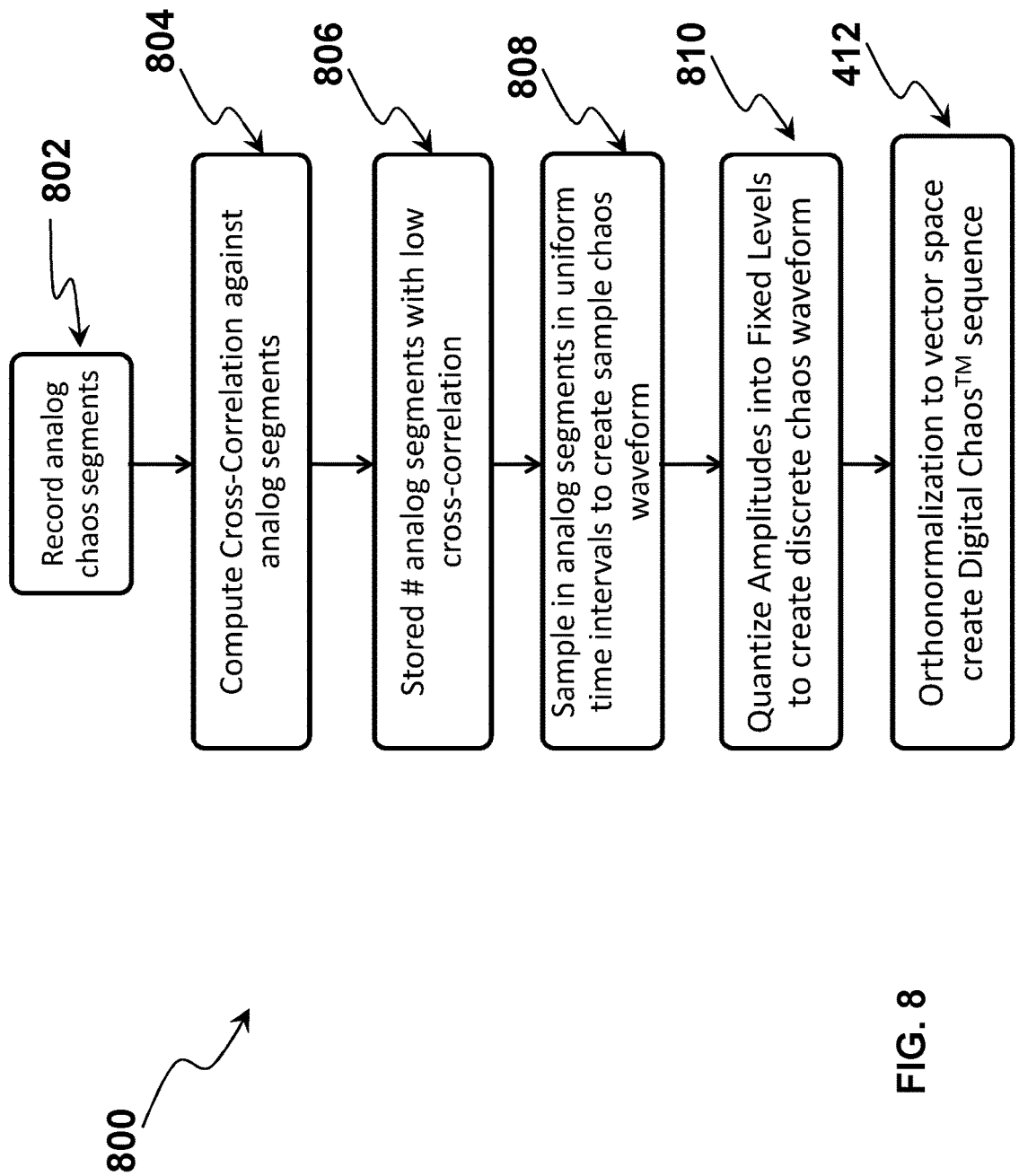
FIG. 8 is a flowchart of an exemplary method for constructing of a digital chaos sequence according to various embodiments of the present invention.

Transmitter 102 receives data source signal 101 and channel encodes the sequence at channel encoder 106. Data source signal 101 may be bits, symbols, or sampled analog waveforms. A chaos spreading code sequence, the construction of which is described below with respect to FIG. 8, is stored in memory at chaos spreading code sequence memory 606. In alternate embodiments of the invention, the chaos spreading code sequence may be used as a chaos spreading sequence without encoding the data source signal. The chaos spreading may occur without channel coding. The chaos spreading transforms the bit, symbol, or sample analog waveform into a digital chaos waveform with information embedded (embedded data) in the amplitude and phase of the digital chaos waveform.

In accordance with the present invention, chaos modulator 108 uses the chaos spreading sequence in modulation to generate a data payload having pre-ambles and mid-ambles. The pre-ambles and mid-ambles may be constructed so that multiple embedded signals can be detected at one or more locations without interference from the native performance of each constituent signal. In one particular embodiment, the data payload may be comprised of at least one chaos modulated signal and at least one other signal (either chaos modulated or not) signal that is part of a cooperative network protocol. The pre-amble and mid-amble may also be constructed by repeating the digital chaos sequence of sign flipping a copy of the digital chaos sequence in the next extended symbol period.

In one exemplary embodiment, the data payload includes pre-ambles and mid-ambles that may be constructed so that the data payload may be augmented for the inclusion of a signal field and a symbol delimiter within each of aggregated digital signals. The augmented data payload may include digital information within multiple digital chaos waveforms so that the time of arrival of each constituent signal, part of the aggregated digital signals can be identified accurately and reliably. A signal field portion instructing the receiver of at least one length information of the digital signal and data rate scheme information for the remaining payload. Further, the signal field may contain parity information for protection against and detection errors of other information within the signal field.

During operation of chaos modulator 108, the data source signal is spread with the chaos spreading sequence stored in chaos sequence memory 606 using, for example, spreader 602. The chaos spreading sequence may be used in the generation of the pre-amble 608 and the mid-amble 610. The payload generated by chaos modulator 108 may be augmented to include the symbol delimiter 612 and signal field 614 as is described with respect to FIG. 10.

FIG. 6 depicts any one of the chaos modulators 108 (or chaos modulator 208) in further detail. According to FIG. 6, transmitter 108 may include a channel encoder 106 and a symbol mapper 402 of similar operation as described above. Chaos modulator 108 may include a mixer 602, 616, a multiplexer 604, a RF oscillator system 112, and antenna 114 that are traditional elements as are found in the prior art. As such, their construction and operation is not discussed in here for brevity.

During operation, transmitter 102 receives a data source signal at encoder 106 which channel encodes the data source signal. The data source signals may be any information bearing signals such as bits, symbols, or sampled analog waveforms.

A chaos spreading sequence, the construction of which is described below with respect to FIG. 8, is stored in memory at chaos spreading sequence memory 606. In alternate embodiments of the invention, the chaos spreading sequence may be used as a spreading sequence without encoding the information signal. The chaos spreading transforms the bit, symbol, or sample analog waveform into a digital chaos waveform with information embedded (embedded data) in the amplitude and phase of the digital chaos waveform.

The digital chaos sequences stored in chaos sequence memory 606 are constructed using, for example, the digital chaos sequence generation method 800 of FIG. 8. The digital chaos spreading code sequence may be constructed by recording native analog chaos circuit. Alternatively, the digital chaos sequence may be constructed by recording computer simulated non-linear dynamics of deterministic and segmenting the recorded signal. (Step 802) The recorded segments are sampled such that successive samples appear independent, and segments of a predefined length and variable quantity have low cross correlation. (Step 804) The samples may then be stored in memory. (Step 806) Sampling rate or sampling period may be varied or irregular, but the number of samples taken is fixed for a particular spreading factor and can be any number of samples for the spreading factor. In accordance with the invention, the segments are quantized. (Step 810) The mean value of the recorded segments is then subtracted and the recorded segments are normalized. (Step 812) Normalization of the sequence ensures that autocorrelation peak occurs at unity or near unit because of the quantization errors.

An irregular sampling interval according to the invention may be, for example, determined by modulo counting of a known sequence generator such as Fibonacci numbers, Lucas numbers, Perrin numbers or any pseudo random number generators. For implementation ease with semiconductor technologies for digital system, the amplitudes may be quantized to finite levels based on the maximum allow cross-correlation ($\frac{1}{2^L}$), where is L is the number of bits used to represent by each sample amplitude) between code sequences. Independent segments of the digital chaos sequences are grouped together to form a vector span for transmitting the information-bearing communication signals or training signals. It is well-known in mathematics that any signal in an n-dimensional subspace can uniquely represented an n-tuple of scalar corresponds to the projection of the signal onto the orthonormal bases of the n-dimensional. The final step of the digital chaos process is to convert the independent digital chaos segments into a group of orthonormal sequences spanning the same subspace as the original segment. This process may be performed using the Gram-Schmidt orthogonalization process.

The chaos sequence memory 606 (and the chaos replica memory 706 of FIG. 7) may be a volatile memory. Chaos memory 606/706 may be partitioned such that groups of digital chaos spreading codes are stored independently of each other. For example, the distinct groups may be organized according to the application for which it will be used. Typical applications include any wireless applications requiring voice over IP (VoIP) capability, video capability, and data capability for point-to-point operation and/or point-to-multi-point. Inside the groups, the volatile memory is further partitioned into slots for storing a digital chaos sequence code. The slot may be further partitioned into a plurality of sub-slots for storing subsets of the of the digital chaos sequence.

Once the chaos sequence memory 606 is fully populated with digital chaos spreading sequences, the entire memory 606 may be subjected to Gram-Schmidt processing. The entire memory 606 may be subjected to an orthonormalization process. In alternate embodiments, independent digital chaos segments may be converted into a group of orthonormal sequences spanning the same subspace as the original segment.

Figure 10:
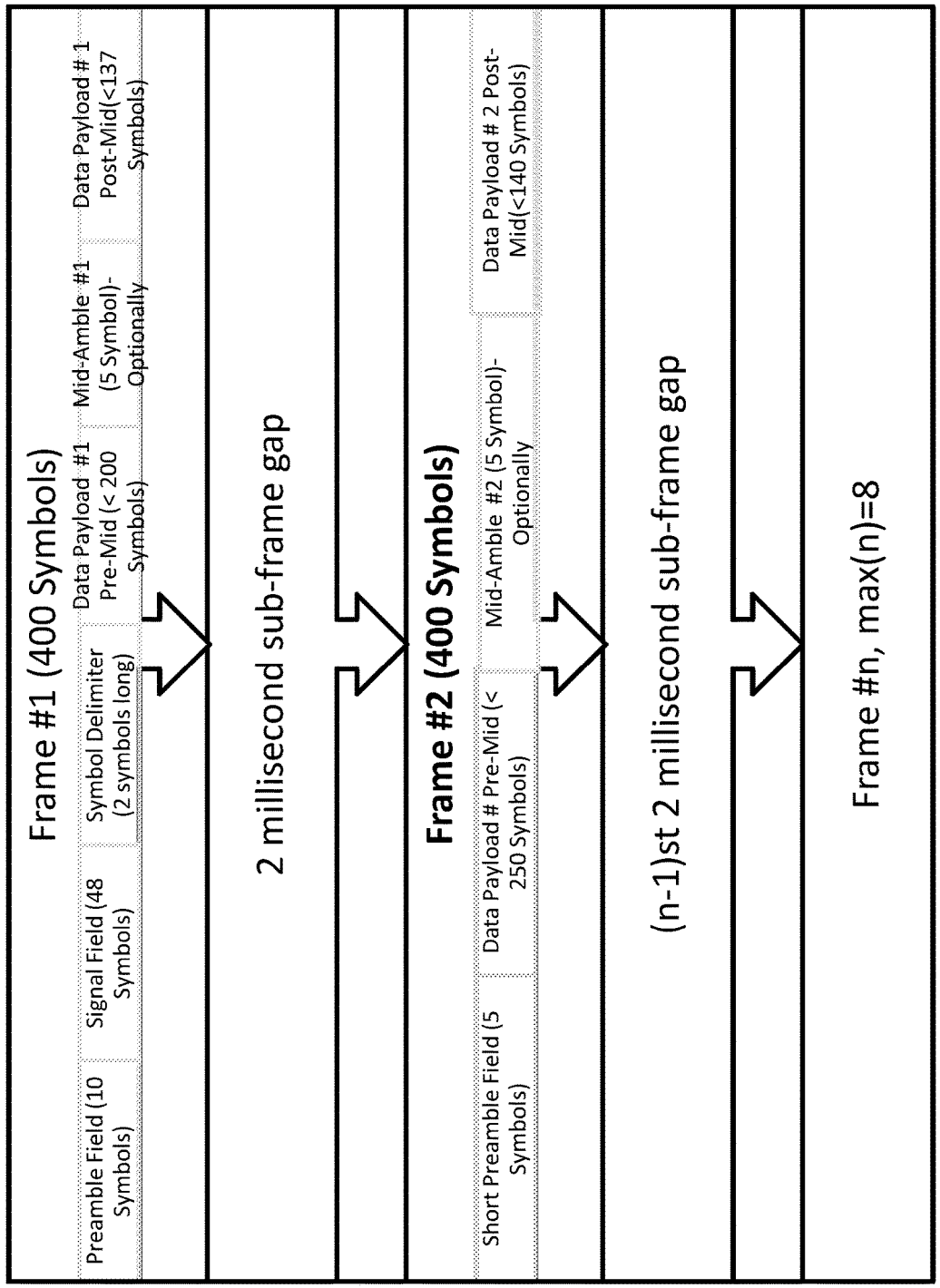
FIG. 10 Is an exemplary embodiment of packet formation according to various embodiments of the invention.

A preferred embodiment of the invention for the packet formation is shown in FIG. 10 In this exemplary embodiment the sample rate at the receiver is targeted at 20 MHz and the chipping rate is proposed at 4 Mcps at the transmitter. The minimum center frequency spacing between adjacent systems will be 5 MHz. The framing structure may be a radio frame of 10 ms divided into 5 sub-frames of equal duration 2 milliseconds (ms). These sub-frames may be configured as transmit or receive slot for any user.

A super-frame consists of several frames transmitted in succession with 2 ms gap spacing between frames. Each frame to be transmitted consists of a preamble training sequence, mid-amble training sequence, and data payload. The flexibility of frame structure can accommodate many other embodiments to specific applications. In this embodiment, sufficient training information is included to securely and reliably.

As is well known, the key to a successful wireless design is to incorporate sufficient training information to recognize the arrival of packets, align symbol boundaries, estimate channel characteristic and correct for frequency offset. In one embodiment of the invention utilizes a header field. The header field comprises a ten symbol preamble and 48 symbol signal field that defines the configuration state for the receiver. The training sequences are modulated using differential chaos shift keying (DCSK) and repeated predetermine number of times; nine times is used in FIG. 6. Each repetition is modulated with either a 1 or −1 according to normal DCSK techniques. The modulation input can be an alternating sequence of positive and negative ones, embedded with control information for the rest of the packet. The preamble and mid-ambles can have their powers significantly higher than the data to aid in the synchronization at the receiver. For example, one embodiment uses a 3 dB boosted in relative power to the data samples. This will permit the high probability of detection without an overly burdensome overhead for the frame. If total overhead is 10% or less in duration for the frame, significant improvement in detection and synchronization at the receiver is achievable while sacrificing only 0.79 dB is signal power compared to no power boost. Each symbol is comprised of a chaos sequence of predetermined length that can range from 16 chips to 4000 chips, depending on the application requirements for throughput and covertness. The signal field is comprised on a 6 bit scrambling seed, which is used to initialize the pseudorandom number (pn) generator for sequence pattern. The state of the registers of the pn determines which of $2^6$ stored sequences is selected or, optionally, which sequence in the chaos family should be transmitted for the current symbol.

As previously noted, the present invention addressed problems in traditional MIMO WLAN transmission. Namely, prior art systems such 802.11x compliant system are more susceptible to interference, wireless collisions, and interception by unintended parties. The present invention addresses these problems by providing a system and method for aggregating and embedding multiple information-bearing communication signals within digital chaos communication waveforms occupying the same frequency channel bandwidth transmitted with a multiple antenna system. Digital chaos may be a waveform generated by sampling a chaos signal, where chaos signals are determined by deterministic nonlinear dynamics. Digital chaos sequences generated according to the invention as described below, are used as a spreading sequence in accordance with various embodiments of the invention.

Figure 7:
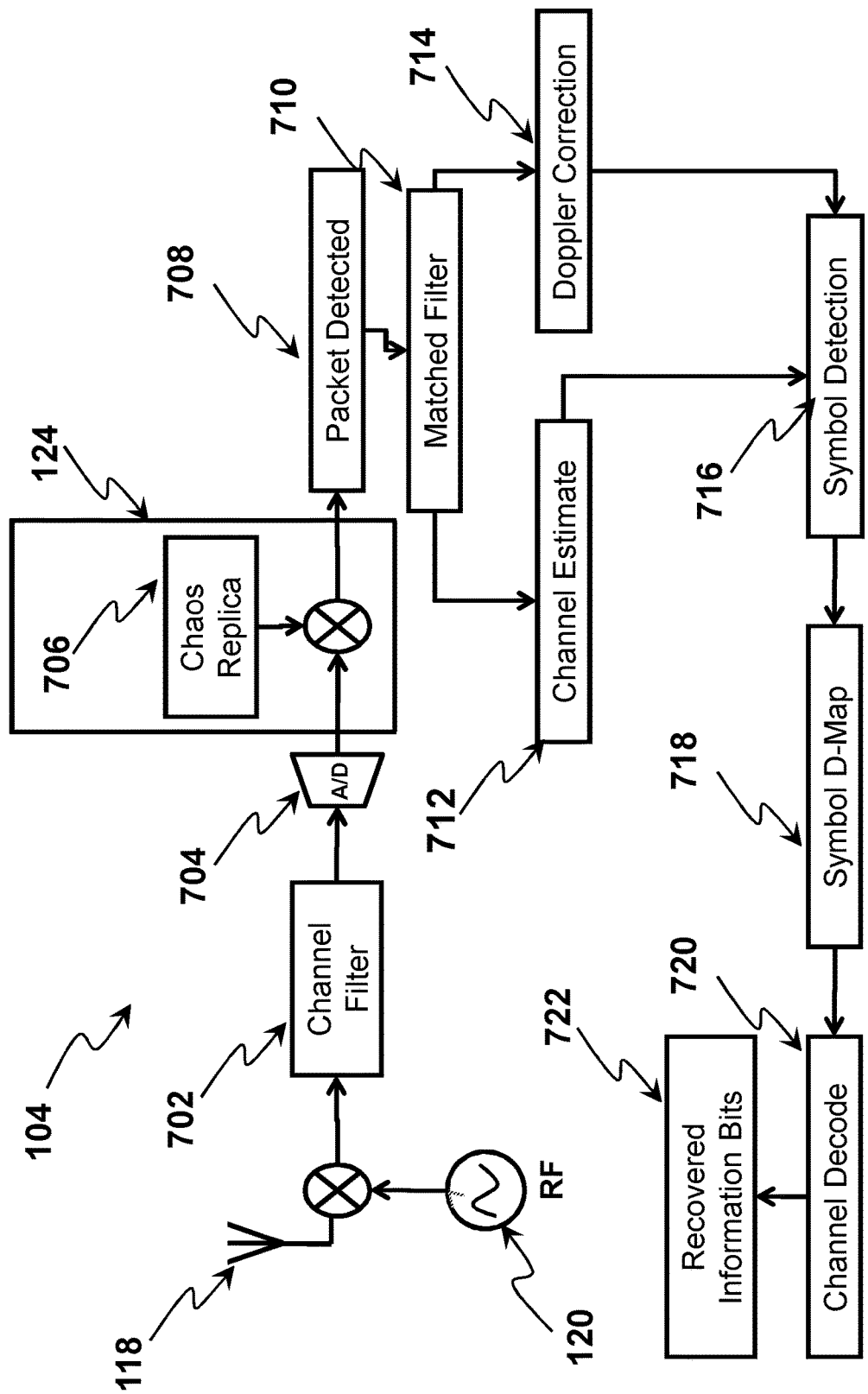
FIG. 7 is an exemplary wireless receiver in accordance with various embodiments of the invention.

The signal transmitted by transmitter is received by a receiver 104 of FIG. 7. Receiver 104 recovers the data embedded data in the transmitted data source signal. In accordance with one aspect of the invention, the digital chaos sequence stored in chaos sequence memory 606 used as a spreading code for spreading the data source signal at transmitter 102 is compared to the digital chaos sequence stored in chaos replica memory 306. As noted before, chaos demodulator 124 uses a replica of the digital chaos sequence stored in chaos replica memory 706 as a despreading code.

FIG. 7 is an exemplary embodiment of receiver 104 for receiving the digital chaos waveform. Receiver 104 includes an antenna 118 for receiving the transmitted signal, channel filter 702 to reject signals not in the band of interest, analog-to-digital (A/D) converter 704 is used to sample and quantization the analog signal for digital processing. A chaos replica memory 706 provides an exact replica of the digital chaos waveform stored in chaos sequence memory 606 at the transmitter 102. Packet detection 708 operation is performed to determine when at least one packet arrives. A matched filter 710 is used to recover symbol timing for at least one signal. A channel estimator 712 may be used to estimate and compensate the distortions to the waveform due to multipath fading. Doppler Correction 714 may be used to estimate and correct frequency offsets to due oscillator drift and mobility. Receiver 104 may also include a symbol detection device 716 to estimate the mapping symbol sent by the transmitter, a symbol D-map look-up table 718 to recover informational symbol, and a channel decoder 720 to recover the original transmitted bits 722. The recovered information bits 722 may be provided to one or more data sinks (not shown).

Receiver 104 receives the transmitted signal to recover the embedded data from the signal. It should be noted that there may be two common receiver modes in preferred embodiments. In the first mode, the high-speed multiplication with chaos replica memory 706 occurs directly after operation of A/D 704. This embodiment is preferred when a sampled analog waveform is the information-bearing signal. In the second mode, the high-speed multiplication with chaos replica memory 706 occurs prior symbol detect 716 and after Doppler Correction 714 and channel estimation 712 operations. This embodiment is best suited when the information-bearing signal, bits or symbols. Either configuration works for the information-bearing signals in the form of bits or symbol. However, the second mode has the best performance and the first mode has the lower power consumptions. After despreading the high-speed digital chaos sequence, the receiver operations are typical of those performed by commercially standard receivers for 802.11x, WCDMA, or CDMA 2000, the description of which is omitted for the sake of brevity.

The chaos modulator 108 and demodulator 124 may be implemented as part of a wireless local area network (LAN), wireless personal area network (PAN), wireless home area network (HAN) or metropolitan area network (MAN) system, a cellular telephone system, or another type of radio or microwave frequency system incorporating one-way or two-way communications over a range of distances. The invention may employ various signal modulation and demodulation techniques, such as single-carrier frequency domain equalization (SCFDE), direct sequence spread spectrum (DSSS) or orthogonal frequency division multiplexing (OFDM), for example. However, throughout this description, references are made with respect to a SIMO and MIMO communication systems or a system including a transmitter and receiver merely to facilitate the description of the invention. All the similar components of the wireless channels 711 will also have similar descriptions to each other.

The transmitters of the present invention may transmit different signals from each antenna in transmit antenna array so that each signal is received by the corresponding antenna in a receiving antenna array at the receive side. Various transmitters described herein may transmitted the data source signal as an aggregate signal and received as an aggregation of all the transmit signals, or an aggregation of parts of the signal. All signals are transmitted once and the receiver demodulates the aggregate signal using a replica of the chaos spreading sequence spreading code stored in chaos replica memory at the receiver.

Figure 9:
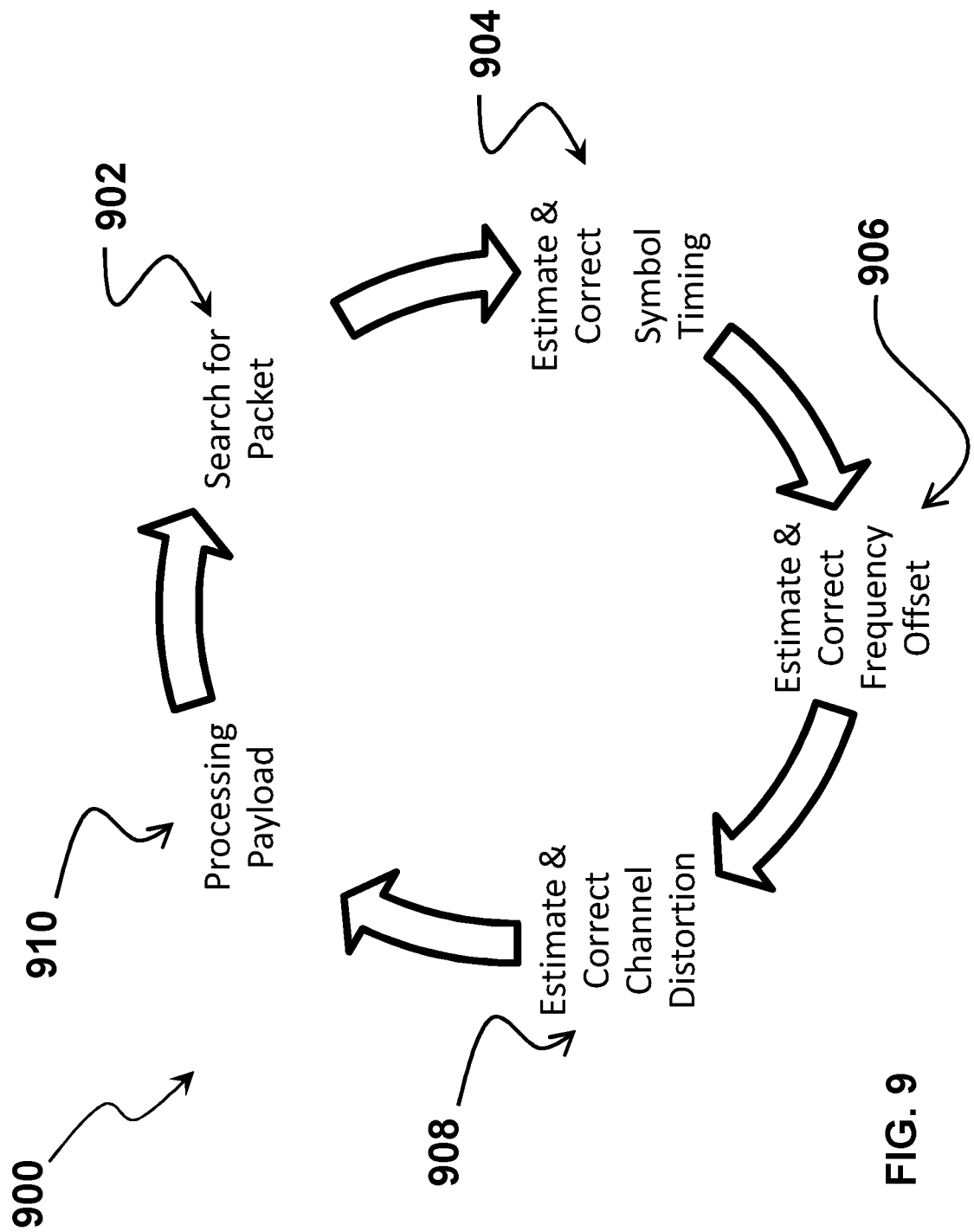
FIG. 9 is an exemplary receiver synchronization process according to various embodiments of the invention.

FIG. 9 illustrates a method 900 for recovering the data embedded in the transmitted data source signal. In recovering the data, receiver 104 receives the transmitted signal and recovers the data signal by the following steps depicted in FIG. 9: The packets are continually searched until the receiver detects the arrival of a valid packet (step 902). The detection of the packet is based on the output of a free-running correlation (packet detected 708) that exploits the preamble structure. The validity of the packet is determined from the cyclic redundancy check (CRC) of the signal field shown in FIG. 10. After the packet has been declared valid, the preamble is used to perform two synchronization processes: symbol timing estimation & correction (step 904) and frequency estimation & correction (step 906). A match filter or bank of matched filters 710 is used to estimate the timing error and the appropriate correction is made in the receiver timing. A separate correlator is used to estimate the frequency error, such as for example Doppler Correction 714 and the appropriate correction is applied to the baseband received signal. The channel estimate is computed using the pre-computed convolution matrix based on the training symbols from the preamble. The pseudo inverse of this matrix, which can be also computed off-line since it doesn't change unless the preamble changes, is used to compute the minimum mean square estimate of the channel taps (channel estimator 712) (step 908). Averaging is possible for each of process steps 902, 904, 906, and 908 based on the repetition of the training symbols in both the preamble and mid-amble. The payload may then be processed (step 910). For example, processing the payload may include detecting a symbol (symbol detection 716), mapping the symbol (Symbol D-Map 718), channel coding or decoding the payload (channel decoder 720) and recovery of information bits 722 contained in the payload.

Figure 11:
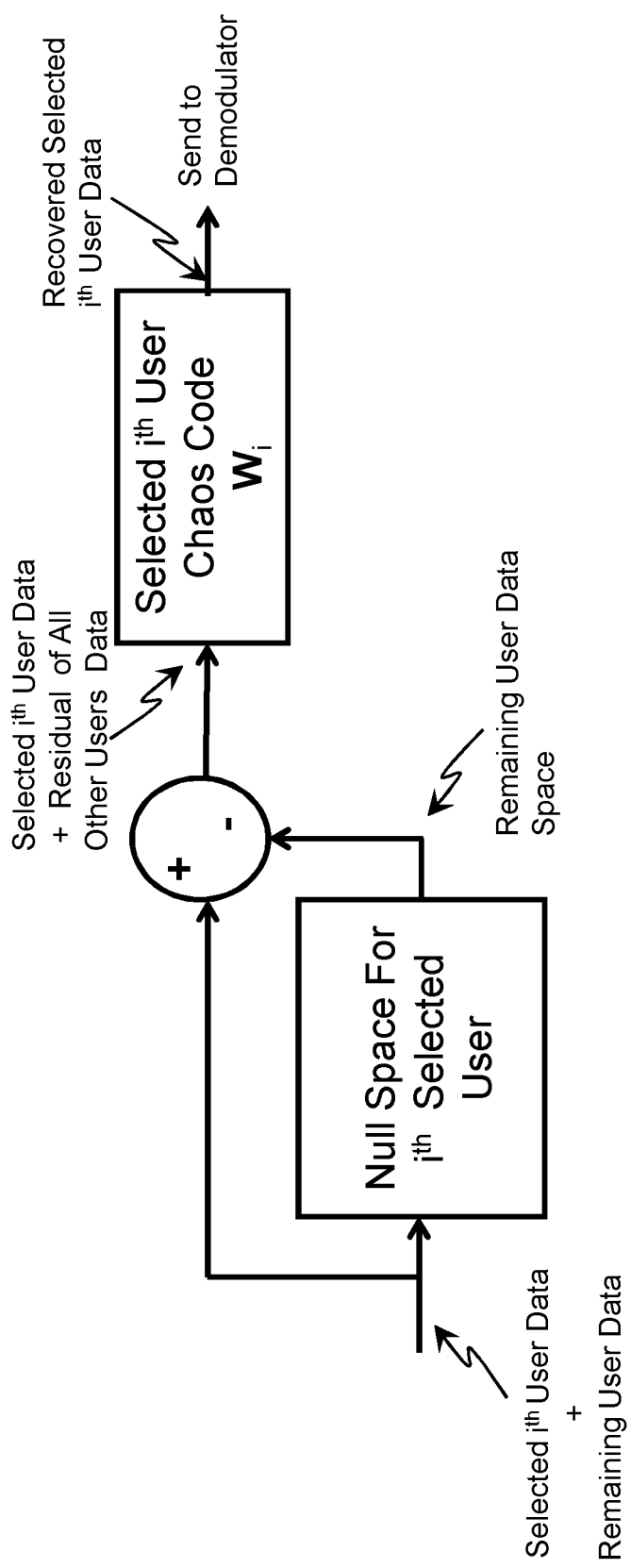
FIG. 11 is an exemplary embodiment of null space processor subsystem of the invention.

FIG. 11 is an embodiment of an exemplary null-space processor subsystem which may be useful with the communication systems described in this invention. In accordance with this exemplary subsystem, the signal to be recovered ("the Selected $i^{th}$ User Data") and the remaining signals (the "Remaining User Data") are multiplied in the null space processor (Null Space for $i^{th}$ Selected User corresponding to the Selected $i^{th}$ User Data producing a signal containing the Remaining User Data signals. The Remaining User Data signals are then subtracted from the signal containing the Selected $i^{th}$ User Data and the Remaining User Data such that Selected $i^{th}$ User Data is output. In some instances, the output Selected $i^{th}$ User Data may appear with residual signals from the Remaining User Data. The Selected $i^{th}$ User Data may then be recovered by using the Selected $i^{th}$ User Data to identify the $i^{th}$ User Chaos Code for recovering the $i^{th}$ User Data as described above.

The digital chaos systems and methods of the present invention are suitable for operation in wireless transmissions desiring coordinated transmissions to enhance network capacity. Such systems often require multiple transactions between tightly coordinated nodes or access points. By coordinated, what is meant is that the transmission protocol of each node (receiver) in a network is organized into a relationship with a second receiving node in the network to ensure that subsequent transmissions are efficient according to the requirements of the network. By efficient, what is meant is that the node to node transfer is optimized according to the requirements of the node or the requirements of the transmission medium. In one instance, improving efficiency may include improving the throughput of the network. Coordinated nodes may be such that one node, or a group of nodes may include a transmission protocol that depends on the transmission received from one node in the network or the group of nodes. In the instance where multiple nodes depend on a transmission received, and the transmission protocol of a multiple of nodes may cooperatively communicate to ensure optimization of the network or transmission medium.

One transmission protocol that can require coordination is adaptive changing of channel by a group of nodes. By channel, what is meant is an available time slots, hopping frequency, independent spatial path, or distinct digital chaos sequence at a transmitting side. By time slot, what is meant is the next transmission opportunity (Txop) after a channel reservation request expires, the channel is idle for a specified period of the time including time requirement for a delay and disruption tolerant protocol known at the receiving and transmitting side, or the channel is busy and the number of digital chaos signals are less than the multi-user limit for simultaneous transmission. By hopping frequency, what is meant is any of the tunable center frequencies of capable by the equipment that is permitted in a hopping sequence; whereby the minimum spacing between center frequencies is equal to the chipping rate of a generated digital chaos sequences at the transmitting side. By independent spatial path, what is meant is that separate paths arriving at the receive side wherein the cross-correlation between paths are sufficiently small such that low to ensure the transmission of the information at the rate and with the quality required under specified conditions. And distinct digital chaos sequence at a transmitting side may originate from the same source or separate sources. In the case wherein they originate from the same antenna, the distinct digital chaos sequences are orthogonal by construction and hence meet the requirement to be considered separate channels. In the case wherein distinct digital chaos sequence at a transmitting side originate from difference antennas, results in sufficient differential signal attenuation for different arriving paths at the receive side coupled with the cross-correlation between distinct digital chaos sequences to ensure each transmission of the information at the rate and with the quality required under specified conditions. Determination that the channel of the wireless medium is busy or currently in use is achieved by sensing the physical channel using one of several method techniques taught in the prior art (referred to as detectors) and comparing against a predetermined threshold. Some of these detectors can be applied directly to our circumstances; others have to be adapted to exploit the unique properties of the digital chaos. If the channel metric measured exceeds the predetermined threshold, clear channel assessment (CCA) is set false. For instance, the prior art teaches energy detection as a means of determining assessing CCA for many wireless protocol as a failsafe. An energy detector does not exploit a signal structure or property of the incoming signal at the receive side thus can be applied to any signature; however, some signals such as the digital chaos signals are constructed to reduce the probability of detection by these energy detectors. Other physical channel sensing methods exploits the construction of the signal such as cyclical detectors. Most communication systems exhibit some known periodicity to its structure such as periods of the symbol clock, sample rate clock for intermediate frequency (IF) carrier or RF carrier or even repetition of sequences for training purposes. These known periodicities can be incorporated in a cyclical detector by correlating different segments separated by the known periods and computing the energy over the window of data for which cyclostationary property is valid. For instance, differential chaos shift keying (DCSK) shown in FIG. 6 illustrates the said cyclostationary property by repeating copies of digital chaos sequences a predetermined number of times—9 in this case. A cyclic detector configured to the proper delay and detect the arrival of the preamble and mid-amble sequences if it also knows and the data wiping technique to the incoming sequences. In another prior art, a method of physical channel sensing entails using a match filter. The matched filter is the optimal linear filter for maximizing the signal to noise ratio (SNR) in the presence of additive stochastic noise. A match filter is a linear filter whose coefficients are equal to time reverse, complex conjugate of the sequence is attempting to detect. This method requires duplicate replica of the digital chaos sequences at the receive side to detect the presence of a digital chaos sequence. In yet another prior art, a method of physical channel sensing using Bayesian statistics is employed. In Bayesian statistics, a maximum a posteriori probability (MAP) estimate is a mode of the posterior distribution. The MAP can be used to obtain a point estimate of an unobserved quantity based on empirical data. In the present invention, the unobserved quantity would be one of the allowed digital chaos sequences for the user. Based on the observation at the receive side, one would like to determine the likelihood that a specific digital chaos sequence was sent based on the collected samples at the receiver. In other words, one wishes to maximize the likelihood function of sample distribution at the receive side. Using direct application of Bayer's theorem, we can compute and maximize the likelihood of a digital chaos sequence was sent from the marginal likelihoods of hypothesized likelihoods conditioned on each allowable digital chaos sequence and no sequences sent.

In the instance of multiple transmissions, as noted above, multiple transmissions may create increased opportunities for compromised data transmission or collisions of data transmission. In one embodiment of the invention, the coordinated nodes may include knowledge of the transmission protocol one or more of the other nodes in the network. Alternative, the coordination of the transmissions from one node, or a group of nodes, may depend on the transmission received from a node outside the network or group. In another embodiment, coordinated nodes or coordinated transmission over a wireless medium may mean that transmission from one node coordinated with another node may occur at the next transmission opportunity (Txop) or within the time specified by a delay and disruption tolerant protocol known at the receiving side.

The digital chaos waveform described herein may be used to secure the data transmissions while improving network throughput. For example, coordinated multi-point transmission and reception over heterogeneous wireless networks comprise a set of disparate transmission points, access points or nodes operating in the same cell (e.g., "group"), overlaps cells, or mutually exclusive cells, simultaneously or in a coordinated fashion. Coordinated multi-point transmission may be used to utilize to increase throughput and service quality in wireless networks, particularly at or near the edge of a given cell in a cellular network or group of nodes, access points or users.

A typical cooperative network that may be used with this invention is the Internet of Things (IoT). The IoT refers to interconnection and autonomous exchange of data among devices which are machines or parts of machines. IoT may typically be used to support, for example, Machine-to-Machine (M2M) communication. M2M is defined as data communication among devices without the need for human interaction. This may be data communication between devices and a server, or device-to-device either directly or over a network. Examples of M2M services include security, tracking, payment, smart grid and remote maintenance/monitoring. Consequently, a coordinated network according to the invention may include the autonomous exchange of data among devices nodes or members of the coordinated network.

As used herein, nodes belonging to a single cell may be described as "members" of a single group. In some instances, to facilitate the coordination of wireless transmission, members may be described as members belonging to one group, or to more than one group. Signals received by a specific member may be further processed according to the signal preamble or mid-amble information. Membership to a group requires first a request to join a group by node. The process of joining is characterized by three distinct states: {unauthenticated, unassociated}, {authenticated, unassociated}, and {authenticated, associated}. In one embodiment of this invention, authentication is performed by unique preloaded authentication digital chaos sequences associated with unique identifiers for communicating device. The coordinator for the group has access to a repository of all complementary authentication digital chaos sequences for other authorized devices. These complementary authentication digital chaos sequences are used in the handshaking exchange for response queries between the requesting node and the coordinating node. Analogous to the cryptography exchange procedure wherein a node A desiring to communicate to a node B, send it message encrypted with node B public key. Node B uses it private key and the incoming message to decrypt the package. In this case, Node B demodulates the digital chaos sequences using its complementary authentication digital chaos sequences along with its private unique authentication digital chaos sequences. Node B uses its private unique authentication digital chaos sequences or derivative of to encapsulate any response frame including an acknowledgement frame. In yet another embodiment, after a node has been authenticated it transitions to state two within the coordinating node and an association to a specific group is started. Association to group includes but not limited to exchanges of capability information to the coordinator and verification of the coordinator of a set of rates, digital chaos sequences for data frames, beacon frames, request-to-send (RTS) frames, clear-to-send (CTS) frames and group acknowledgement frames. Completion of this step transitions the state of the node to membership granted status as the coordinator node. The coordinator node provides in one of its data payload of beacon frame information containing a temporary local ID for subsequent communications as well as informs other members of the group of the new member credentials for communicating. Membership to a group is not permanent and maybe voluntarily terminated by the any member group. In additional, the network manager or coordinator may terminate the membership for any member deem detrimental to operation of the network. For example, a rogue node may temporarily gain access to the network but based on its traffic pattern but later kick out of group membership whereby not member will engage in future transmission with that node.

In one embodiment of this invention, authentication digital chaos sequences can share the same level of difficulty to securely update, particularly without exposure to unauthorized listeners or distribute to many users based on a similar process central authority called the certificate authority (CA) in key management for public-key cryptography. Strong cryptography designs strictly adhere to Kerckoffs's Principle in design good encryption scheme; that is, the security of the encryption scheme must depend only on the secrecy of the key and not on the secrecy of the algorithm. The rationale behind the rule is that algorithms are hard to change since they are normally built into software or hardware, which can be difficult to update. In the present invention, the network coordinator that provides some CA functionality for private unique authentication digital chaos sequences.

As used herein, the coordinated multi-point system may be a MIMO system, wherein the members may use multiple antennas at both the transmitter and receiver. The present invention may be also useful "multi-user multiple-input-multiple-output" or "MU-MIMO" systems. As used herein MU-MIMO systems are wireless communication systems in which available antennas are spread over a multitude of independent group members, access points and independent radio terminals, wherein each member has one or multiple antennas. The present invention may also be used with conventional SISO (single input-single output), SIMO (single input-multiple output), MISO (multiple input-single output) systems, or other similar systems as is known in the art.

Figure 12:
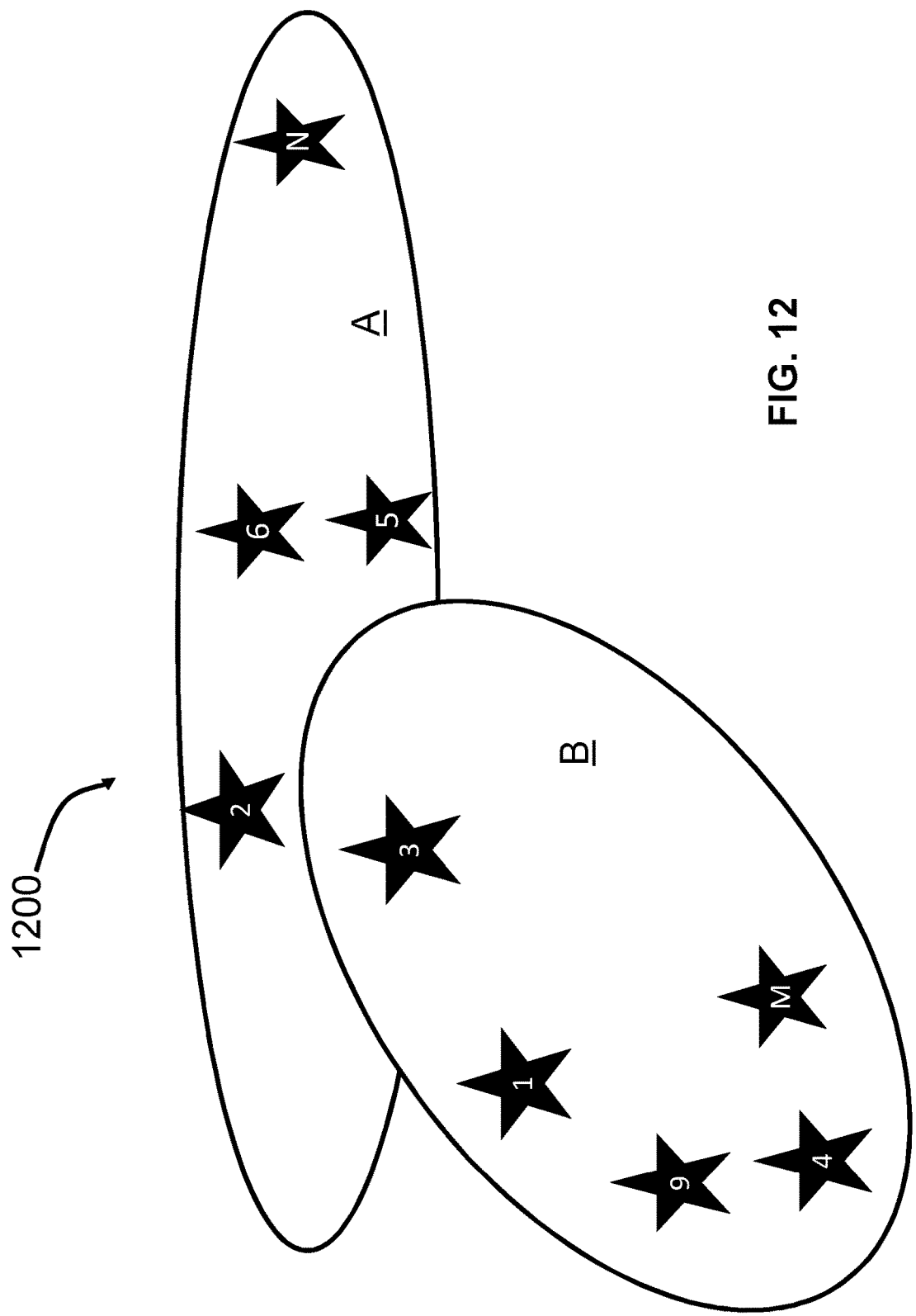
FIG. 12 depicts a typical cell or group arrangement 900 that may be used to describe exemplary embodiments of the present invention.

FIG. 12 depicts a typical cell or group arrangement 900 that may be used to describe exemplary embodiments of the present invention. Group arrangement 900 may include a group A having members A1-An. Similarly, group B may include member B1-Bn. In the example shown, group member B3 may also be a member of group B and also group A. To facilitate description of the invention, when a member belongs to more than one group, the member may be designated with both group designators such as A/B3 depicted in group arrangement 1200.

Figure 13:
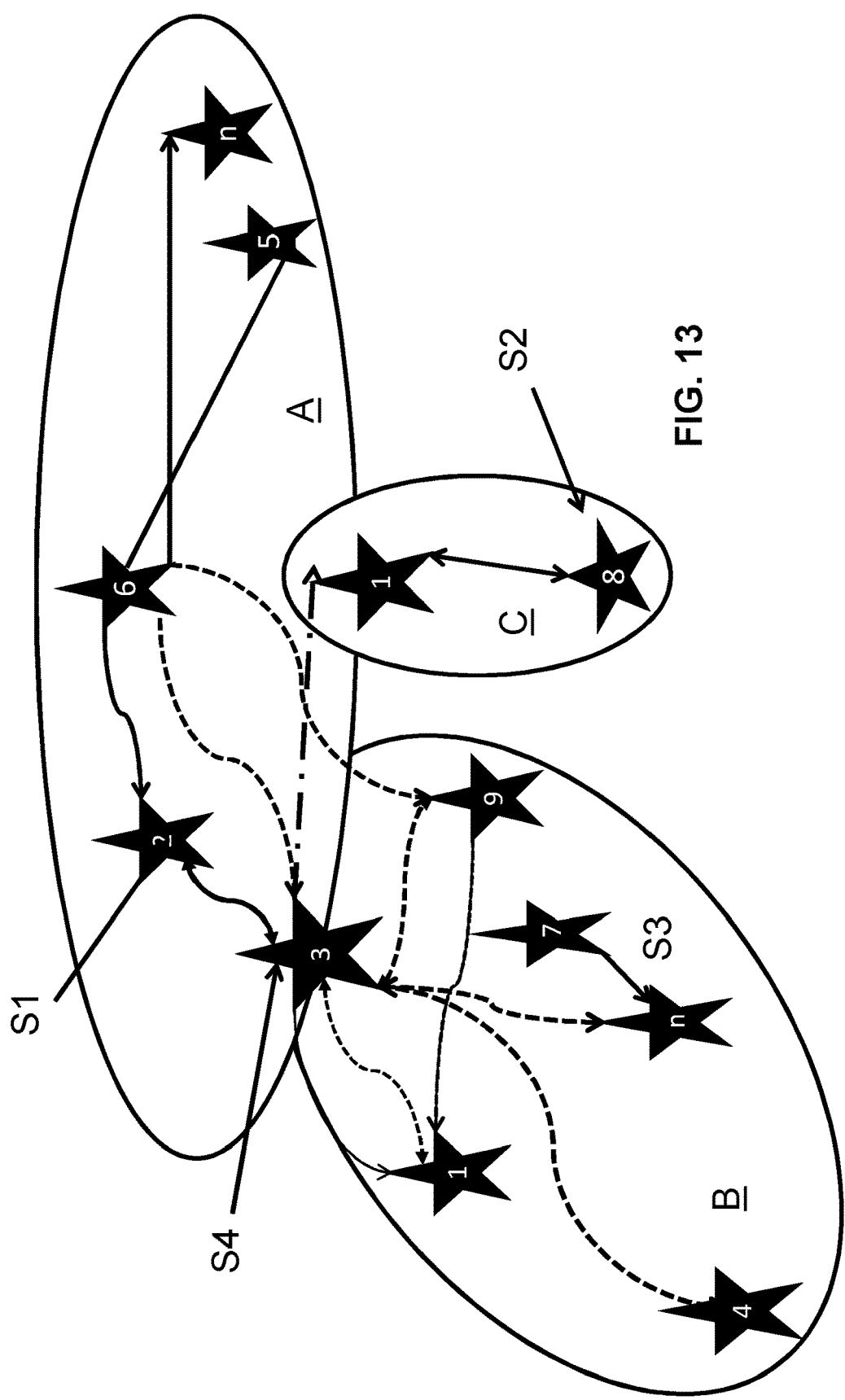
FIG. 13 is an exemplary embodiment of a group arrangement 1300 having group A, group B, and group C'.

FIG. 13 is an exemplary embodiment of a group arrangement 1300 having group A, group B, and group C. While the multiple groups of group arrangement 1300 are depicted as being imbricate, the groups may be mutually exclusive. Where a member belongs to more than one overlapping group, the member may receive and process digital chaos signals addressed to either one of the overlapping groups. In such instance, the member may be called a multi-group member, herein. In the arrangement shown, members A/B3, indicating that the member B3 also belongs to group A.

Group arrangement 1300 further depicts the wireless transmissions that occur when one digital chaos signal is transmitted between members. For example, member A6 may transmit digital chaos signals to member A2, A5 or An; member C1 may transmit digital chaos signals to C8; B3 may transmit digital chaos signals to B1, B4, or B9 depending on how the digital chaos signal is addressed in the digital chaos preamble. In the instance where the digital chaos is received by a multi-group member, the receiving member may transmit the digital chaos signal to the corresponding group member to which the receiving member belongs. This may be true even when the intended group member belongs to a separate overlaps member. By overlaps, what is meant is that more than one group shares at least one group member. In the group arrangement 1300 shown, group A overlaps with group C, and group A overlaps with group B.

It should be noted that the digital chaos signals discussed with respect to the embodiments in FIG. 12 and FIG. 13, may be received from outside any one or all the groups depicted. For example, digital signal 51 is depicted as being generated outside of group A, but received by group member A2. Similarly, digital chaos signal S2 is depicted as being generated outside group C, but being received by group member C8. Contrarily, digital chaos signal S3 is depicted as being generated in group B by group member B7 and received by group member Bn.

In a typical coordinated transmission according to the present invention, group members operate in a coordinated fashion to improve the overall network capacity for all members sharing the wireless medium. By coordinated fashion what may be meant is that signals are processed together to combat the distortive effects of the wireless medium and mutual-interference to improve the detection for all active distinct user data signals. The group members process the extracted distinct user data signals according to membership or non-membership to a specific group. The group member may process the extracted distinct user data signals according to membership or non-membership to a particular group wherein said extracted distinct user data signals not addressed to the receiving side (e.g., receiving member) are aggregated, time aligned, and retransmitted over the wireless medium at the next transmission opportunity (Txop) or time specified by a delay and disruption tolerant protocol known at the receiving side. For example, the delay and disruption tolerant protocol may be such that the network operates effectively over extreme distances such as those encountered in space communications or on an interplanetary scale. On the other hand, where a digital chaos signal is received by a receiving group member to which it is not addressed, the receiving group member may terminate the signal and not forwarded it at all.

In a typical example, using FIG. 13, data signal S4 may be addressed to group member B9, but received by multi-group member A3 (e.g., A/B3). In this instance, group member A3 may extract the distinct user data signal indicating that the data signal is addressed to group member B9. Since group member A3 is also a member of group B (e.g., B3), then group member A3 may transmit the signal to group B. More particularly, A3 may transmit the signal to group member B9.

In some instances, where group members of different groups are in proximity to each other, a receiving group member may receive a first fragment of the received signal, and time delay transmission of the received signal until a second fragment of the received signal is received by the receiving group member.

It should be appreciated by one skilled in art, that the present invention may be utilized in any device that implements the DSSS encoding scheme. The foregoing description has been directed to specific embodiments of this invention. It will be apparent; however, that other variations and modifications may be made to the described embodiments, with the attainment of some or all their advantages. Therefore, it is the object of the appended claims to cover all such variations and modifications as come within the true spirit and scope of the invention.

Figure 14:
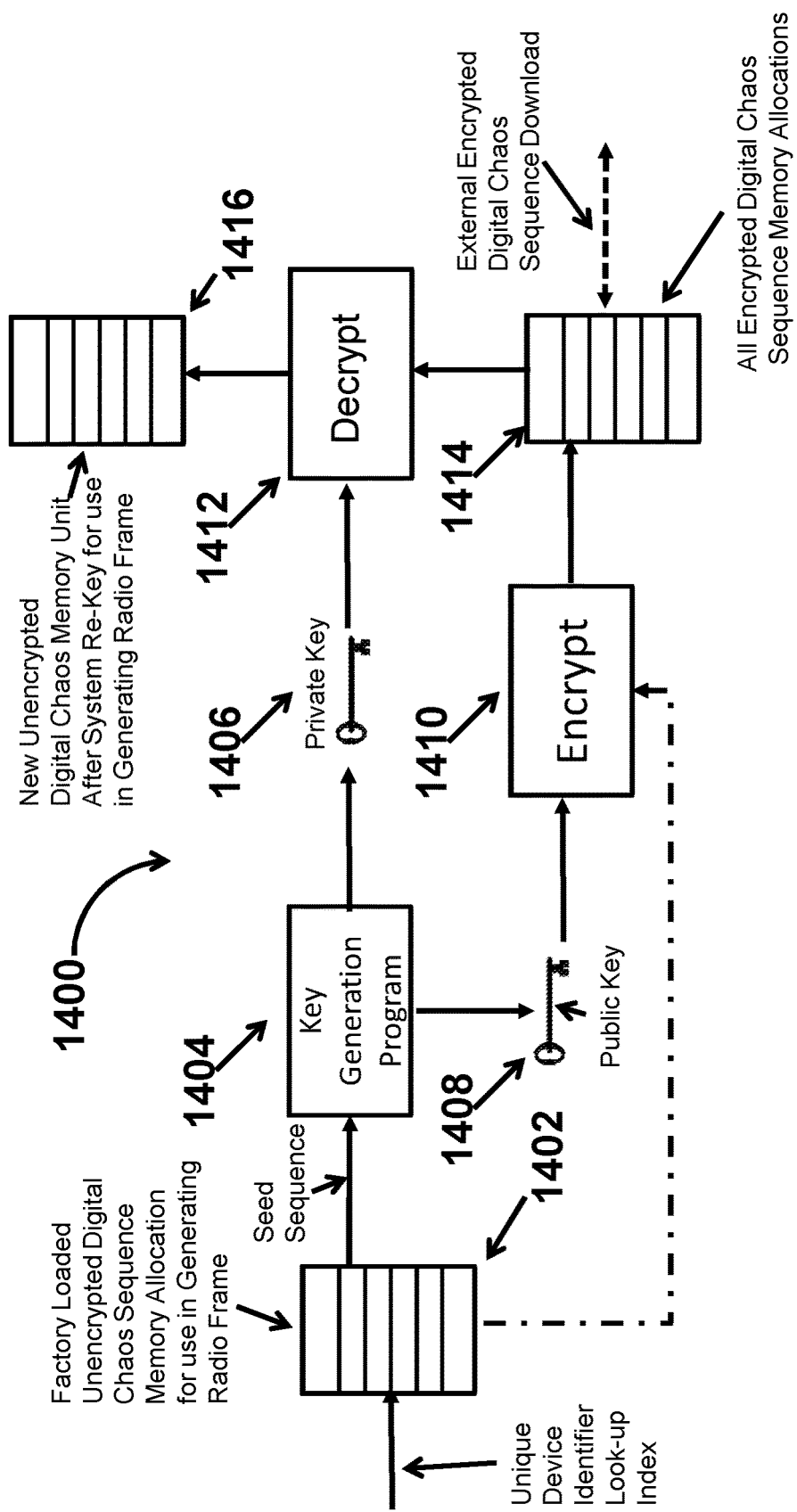
FIG. 14 is an exemplary implementation of unique key management and distribution unit based on a device identification in accordance with various embodiments of the invention.

In another example, the keys for dual level network access is shown using FIG. 14. Private keys are preload onto devices and public keys are managed by each local network manager or coordinator for a group. Public and private keys are paired and generated by the same chaos function. The chaos function may be any chaos function implemented on the device that is known at both the transmitter and the receiver.

Figure 15:
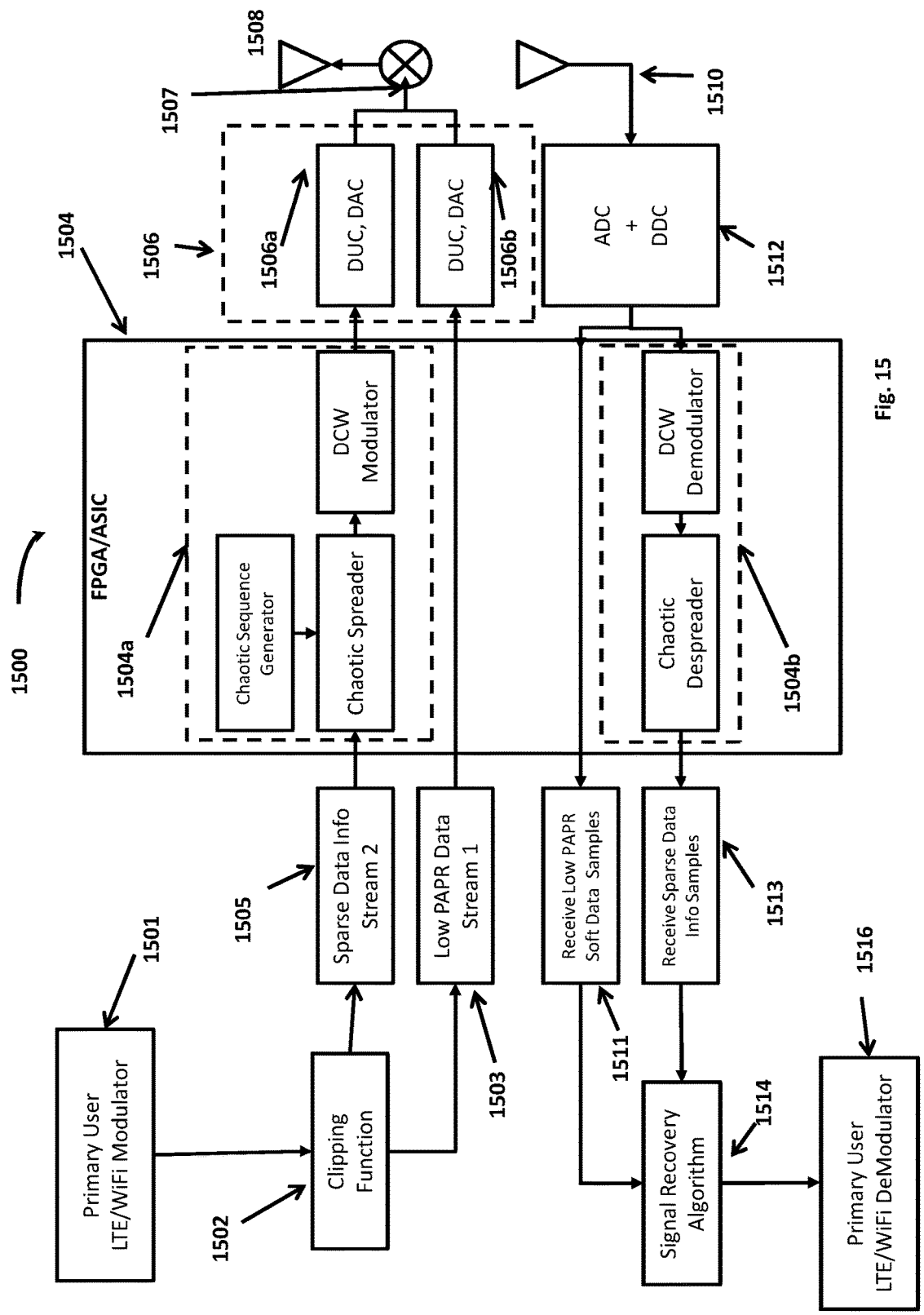
FIG. 15 is an exemplary implementation of dual in-band side channel and primary user transceiver, wherein in-band side channel information rate is much less than the primary user information rate.

A preferred embodiment of an exemplary diagram of a heterogeneous transceiver 1500 according to the present invention is shown in FIG. 15. As shown, a high PAPR baseband signal 1501, such as, for example, LTE or Wi-Fi compliant signal undergoes a clipping function 1502 to produce a low PAPR baseband signal 1503 and a sparse clipping baseband clipping signal 1505 for transmission. The low PAPR baseband signal 1503 is fed directly to an Analog Front End (AFE) 1506*b* of a digital chaos Transmit chain. AFE 1506 may be comprised of more than one digital upconversion (DUC) and digital-to-analog converter (DAC) (DUC, DAC) 1506*a* and (DUC, DAC) 1506*b*. In one embodiment, the sparse baseband clipping signal 1505 is fed to a digital chaos modulator system 1504*a*. Digital Chaos Modulator System 1504*a* may include a chaotic sequence generator for generating chaotic spreading sequences in accordance with the present invention. Digital chaos modulator system 1504*a* may further include a chaotic spreader for receiving the sparse baseband clipping signal 1505, and spreading the sparse baseband clipping signal 1505 with the chaotic spreading sequences generated by the chaotic sequence spreader to produce a chaos spreaded sparse baseband clipping signal. The digital chaos modulator system 1504*a* may further include a digital chaos modulator for receiving and modulating the chaos spreaded sparse baseband clipping signal. The digital chaos modulator system 1504*a* may output the resulting modulated signal to AFE 1506*b* of Digital Chaos transmit chain. The outputs of (DUC, DAC) 1506*a* and (DUC, DAC) 1506*b* may then be summed together 1506 prior to being modulated onto a RF carrier and transmitted by an antenna 1508.

Since both the signal produced by (DUC, DAC) 1506*a* and the signal produced by (DUC, DAC) 1506*b* are modulated on the same RF carrier, the two signals appear spectrally in-band relative to each other. The resulting RF modulated signal may be transmitted out at least one antenna 1508.

At a receiving side, at least one antenna 1510 may receive the RF modulated signal transmitted by antenna 1508. The RF modulated signal received at antenna 1510 may be provided to a downconverter system 1512 including an analog-to-digital converter (ADC) for converting the signal to a digital signal, and a downconverter (DDC) for downconverting the digital signal. The down-converted signal at downconverter system 1512 may be split by into two paths by a splitter (not shown). A first signal path may be provided to a digital chaos demodulator system 1504b for producing an estimate of the sparse data info samples. For example, the first signal path may be provided to a digital chaos demodulator for demodulating the downconverter system 1512 signal. The demodulated signal may then be despreaded by a chaos despreader to recover the sparse baseband clipping signal.

The signal recovered by digital chaos demodulator system 1504b may be sampled to produce the sparse data information samples 1513 of the sparse clipping baseband clipping signal 1505. In another embodiment, the signal recovered by digital chaos demodulator system 1504b may be sampled to produce the recovered clipped amplitudes of the sparse clipping baseband clipping signal 1505 (i.e., a sparse clipped amplitude vector 1513), in which case the recovered signal is sparsely distributed in the estimated time positions of the clipping event within the original frame of the LTE or Wi-Fi baseband receive signal.

A second signal path provided by down-converter system 1512 is signal conditioned to produce low PAPR soft data samples 1511. In one example, the low PAPR soft data samples 1511 and the sparse clipping baseband clipping signal 1513 may be subjected to a signal recovery algorithm 1514. The signal recovery algorithm 1514 processes the low PAPR soft data samples 1511 and recovered sparse clipped amplitudes vector 1513 to produce a received baseband signal substantially void of clipping distortion for final processing at the primary user demodulator 1516. For example, such baseband signals substantially void of clipping distortion are typically required to decode LTE or Wi-Fi compliant signals.

It should be appreciated by one skilled in the art, that the foregoing description has been directed to specific and exemplary embodiments of this invention. It will be apparent; however, that other variations and modifications may be made to the described embodiments, with the attainment of some or all their advantages. Therefore, it is the object of the appended claims to cover all such variations and modifications as come within the true spirit and scope of the invention.

I claim:

1. A method of compensating for in-band distortion using signal recovery of clipping amplitudes of a primary user in a cooperative heterogeneous network of secondary users, wherein the secondary users comprise digital chaos signals, wherein said primary and secondary users are wirelessly transmitted, the method comprising:

measuring the instantaneous amplitude envelope of a primary user, the instantaneous amplitude envelope including multiple measured instantaneous amplitudes, wherein the primary user contains at least one group of Orthogonal Frequency Division Modulation (OFDM) signal components, wherein said instantaneous amplitude envelope is measured at a rate of at least four times the base rate of the OFDM signal components;

clipping at least one of the multiple measured instantaneous amplitudes when at least one of the multiple measured instantaneous amplitudes exceeds a predetermined threshold, said clipping to reduce said instantaneous amplitude envelope to a value no more than the predetermined threshold, wherein the predetermined threshold is derived from the maximum allowable power according to a peak-to-average ratio (PAPR) constraint specified at a transmit side;

collecting multiple clipped instantaneous amplitudes values into a sparse vector, wherein the sparse vector has a nonzero value and a corresponding nonzero value position location, wherein said nonzero value and said nonzero value position location are aligned with instants of clipping for a frame data as defined by the international protocol standard for the primary user;

processing the sparse vector into a first smaller sparse vector containing the sparse vector nonzero value and a second smaller sparse vector containing the sparse vector nonzero value position location;

transmitting the sparse vector nonzero value and the sparse vector nonzero value position location as the secondary user payload of an extremely low powered digital chaos secondary user, wherein the digital chaos secondary user payload is transmitted in-band with a primary user payload;

receiving the digital chaos secondary user payload and said primary user payload at a receive side;

processing the digital chaos secondary user payload in the presence said primary user payload to produce the sparse vector nonzero value and the sparse vector nonzero value position;

using said sparse vector nonzero value and the sparse vector nonzero value position to produce an estimate of the sparse vector; and using the estimated sparse vector to compensate for distortion created by clipping the at least one of the multiple measured instantaneous amplitude.

2. A method of claim 1, wherein the step of clipping at least one of the multiple measured instantaneous amplitudes comprises polar clipping, wherein the multiple measured instantaneous amplitudes exceeding the predetermined threshold is reduced to the predetermined threshold level, but the phase of the sample is preserved.

3. A method of claim 1, wherein the step of clipping at least one of the multiple measured instantaneous amplitudes comprises rectangular clipping, wherein the multiple measured instantaneous amplitudes exceeding the predetermined threshold is reduced to the predetermined threshold level, but the phase of the sample is not preserved.

4. A method of claim 1, wherein the sparse vector nonzero clipping amplitudes and the sparse vector position locations are directly modulated with a digital chaos sequence as part of a secondary user transmission.

5. A method of claim 1 further including mapping said sparse vector nonzero value and said sparse vector position location using a hash function having a load factor, said hash function for producing multiple hash values, wherein the number of hash values equals the number of samples contained in the baseband frame of the primary user and the load factor for the hash is an order magnitude greater than the Complementary Cumulative Distribution Function(CCDF) threshold requirement of a targeted PAPR for a primary user signal, wherein said baseband frame of the primary user includes said instantaneous amplitude envelope measured at a rate of at least four times the base rate of the OF DM signal components.

6. A method of claim 5, wherein said digital chaos sequence comprises a maximum spreading factor and a frame length, wherein the maximum spreading factor is determined by floor operation of the ratio of the frame length to the number of has values.

7. A method of claim 1, wherein the digital chaos secondary user set to a power level, wherein a digital chaos secondary user power level is determined from an error vector magnitude (EVM) caused by the sparse vector compared to that which is allowable by the regulatory standard protocol to which the primary user signal is a compliant.

8. A method of claim 5, further includes the step of mapping the clipping amplitudes to a scaled version of a digital chaos sequences stored on the device.

9. A method of claim 8, further including using a beacon frame with an update clip and a reset clip field element in a signal field of the beacon frame to update the digital chaos sequence used for mapping the clipping amplitudes as part of signal amplitude recovery.

\* \* \* \* \*